Sept. 16, 1958      J. B. COX      2,851,779
ANGLE ADJUSTING MEANS
Filed May 16, 1955      9 Sheets-Sheet 1
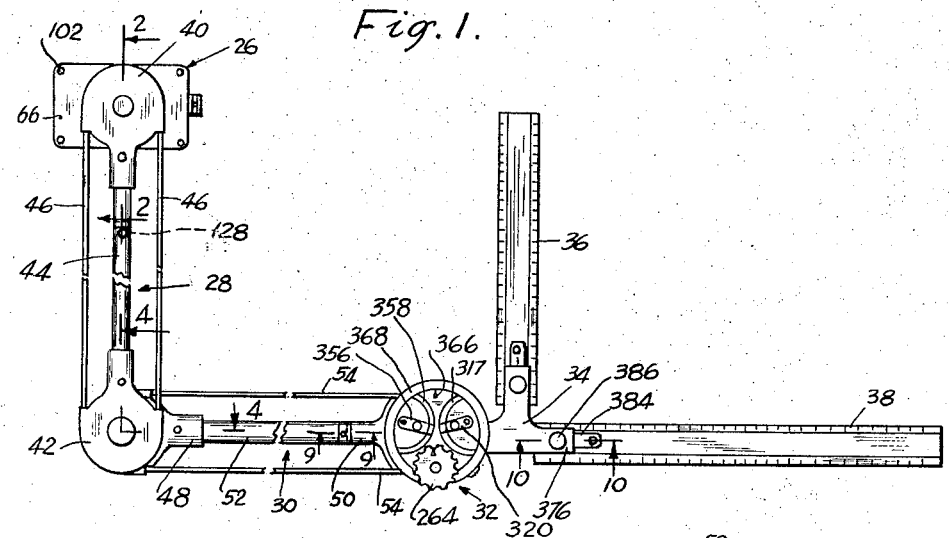
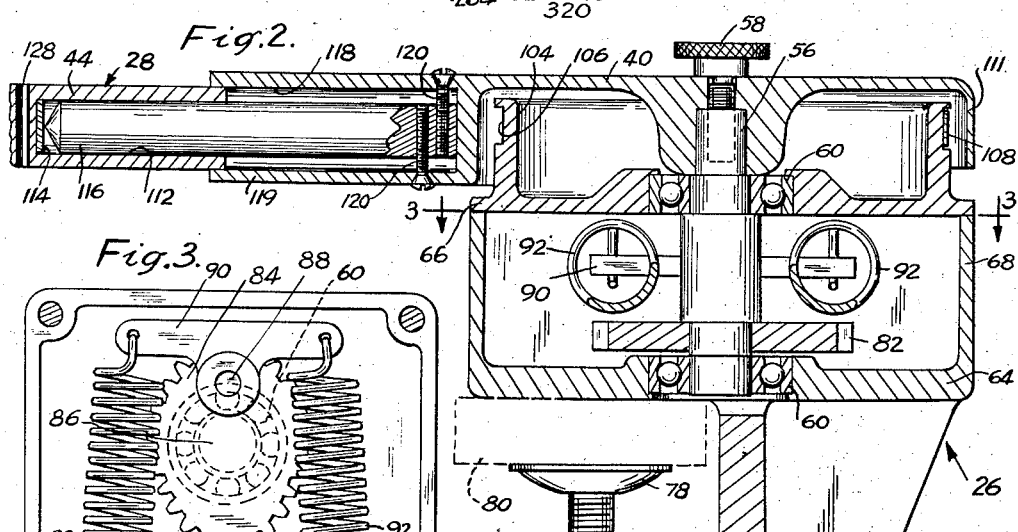
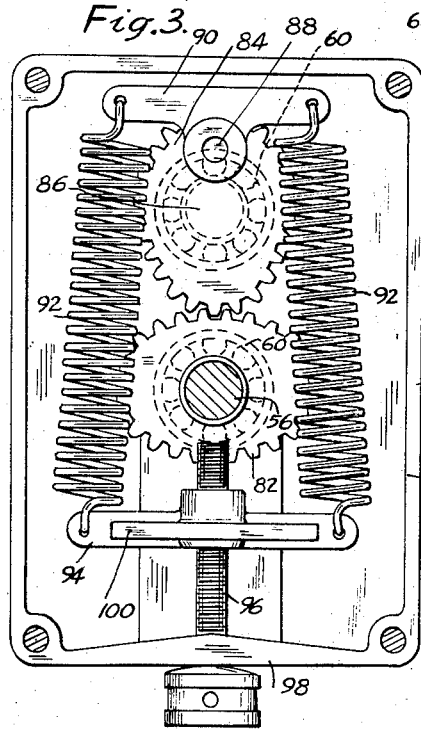
INVENTOR.
JOSEPH B. COX
BY
Buckhorn and Cheatham
ATTORNEYS

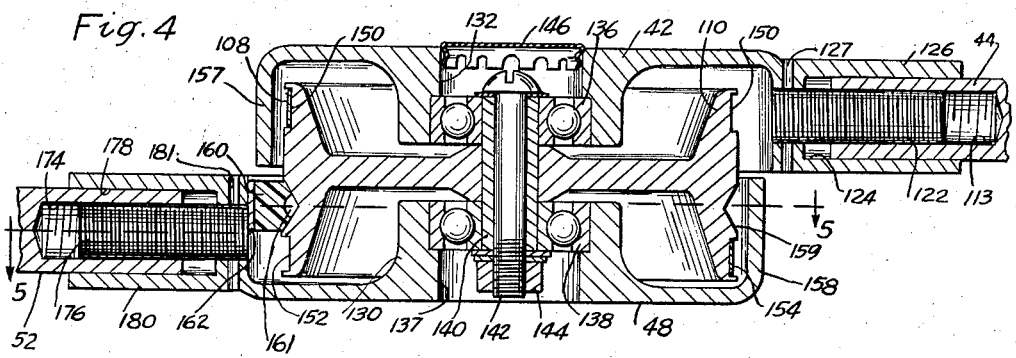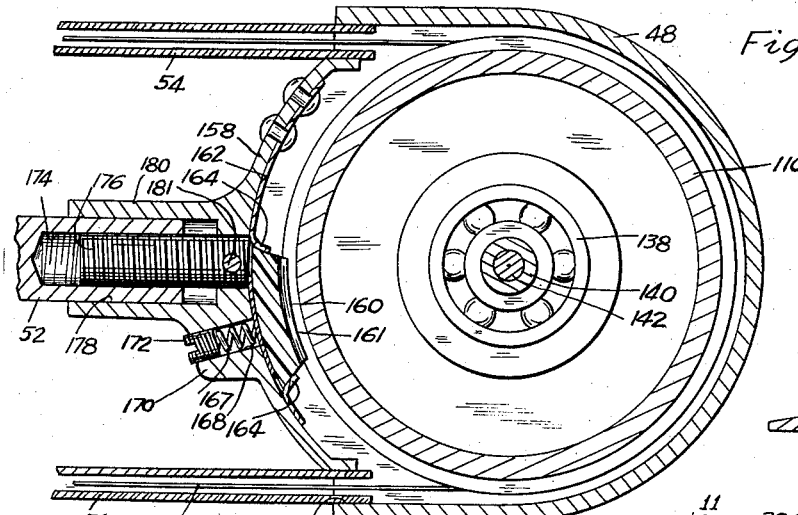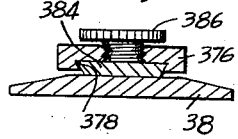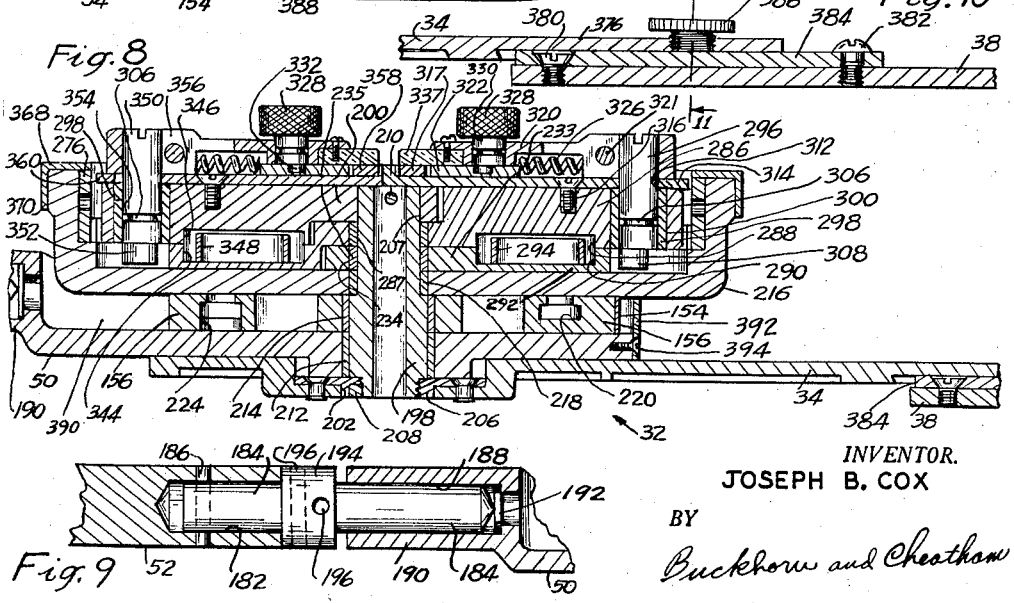

Sept. 16, 1958             J. B. COX             2,851,779
ANGLE ADJUSTING MEANS
Filed May 16, 1955                                          9 Sheets-Sheet 3
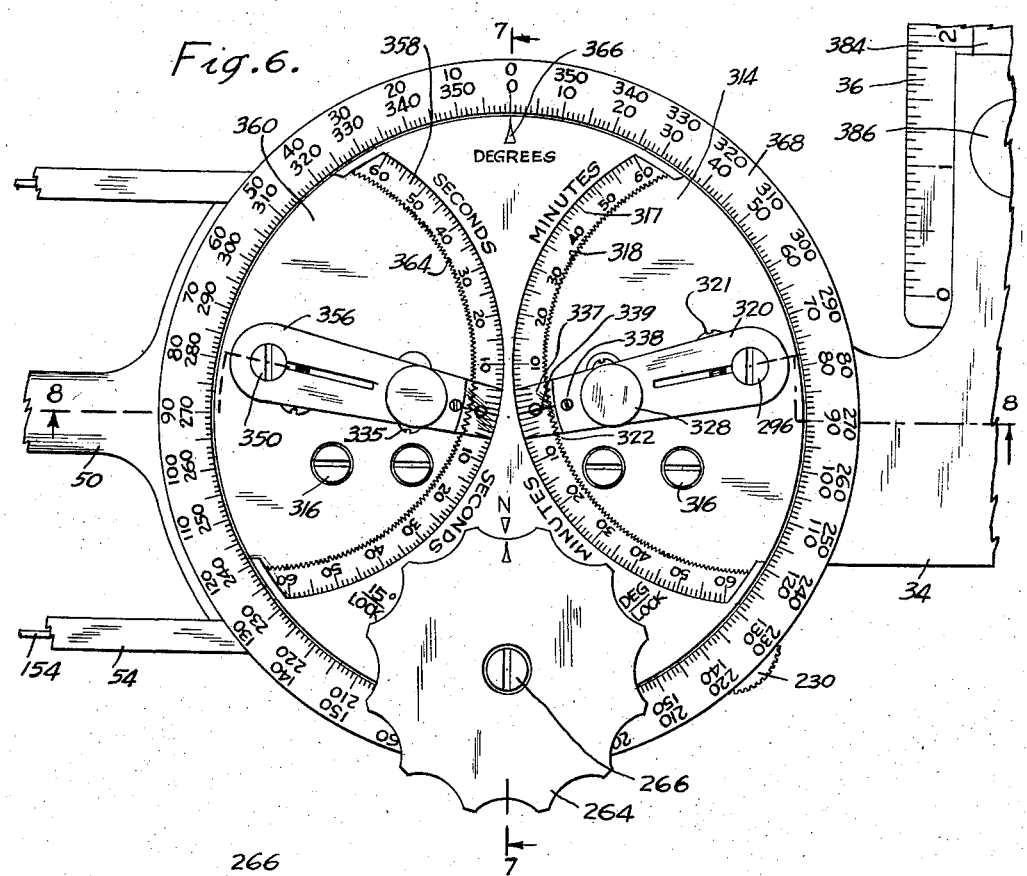
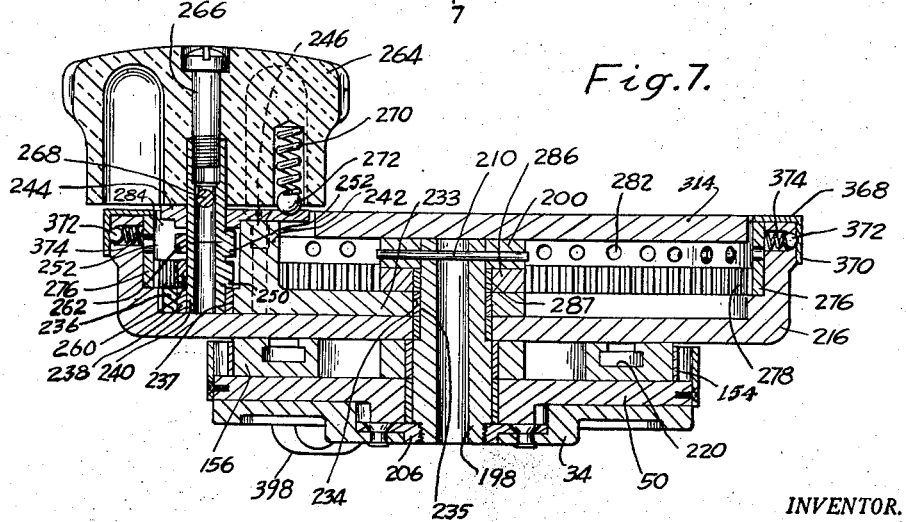
INVENTOR.
JOSEPH B. COX
BY
*Buckhorn and Cheatham*
ATTORNEYS Sept. 16, 1958  J. B. COX  2,851,779
ANGLE ADJUSTING MEANS
Filed May 16, 1955  9 Sheets-Sheet 4
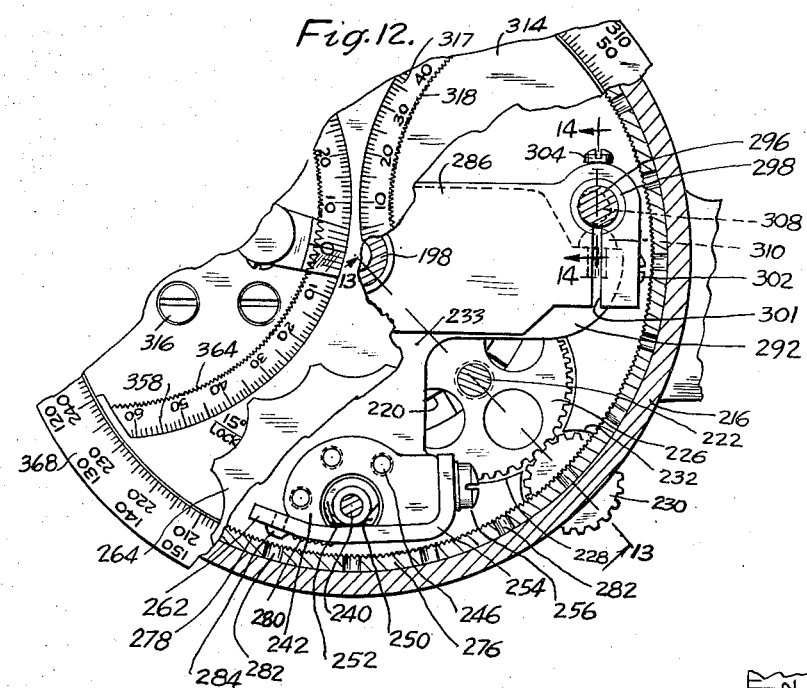
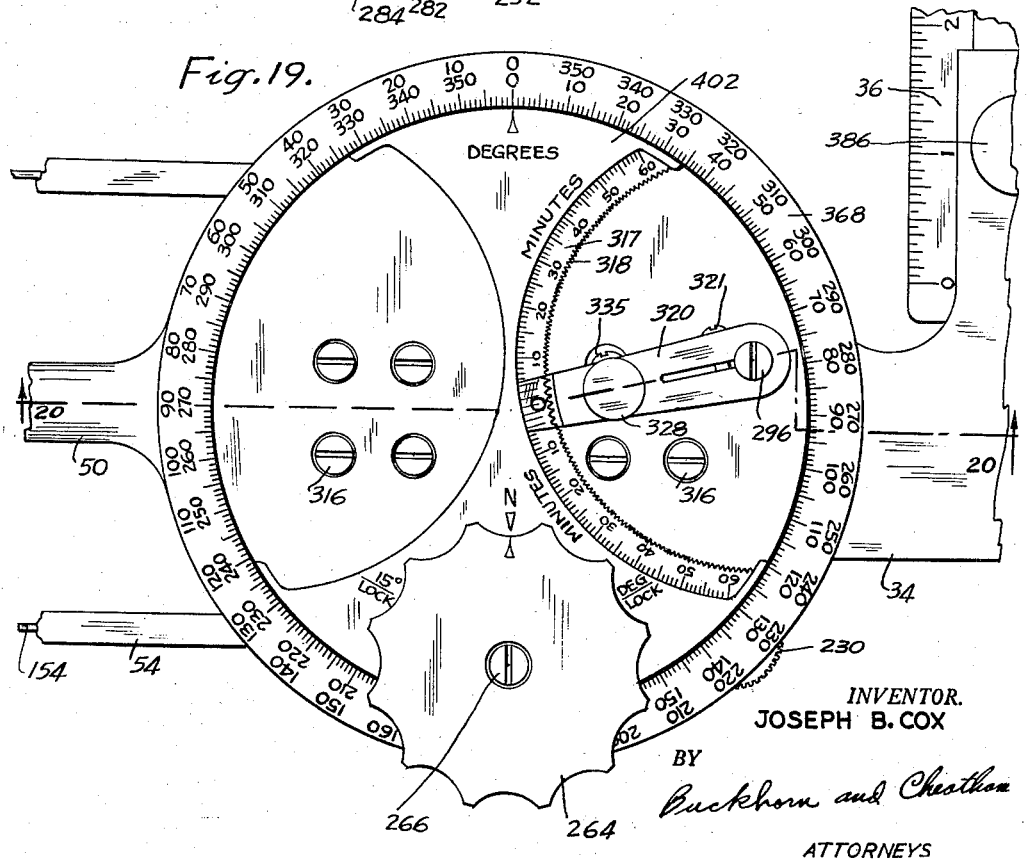
INVENTOR.
JOSEPH B. COX
BY
Buckhorn and Cheatham
ATTORNEYS Sept. 16, 1958  J. B. COX  2,851,779
ANGLE ADJUSTING MEANS
Filed May 16, 1955  9 Sheets-Sheet 5
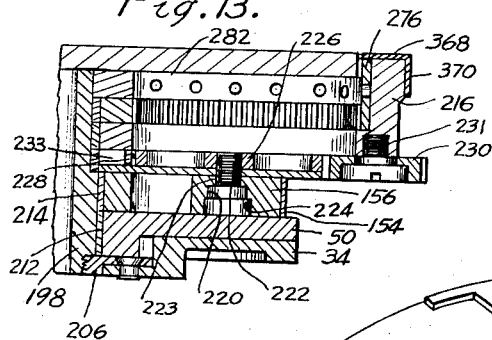
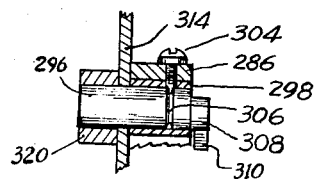
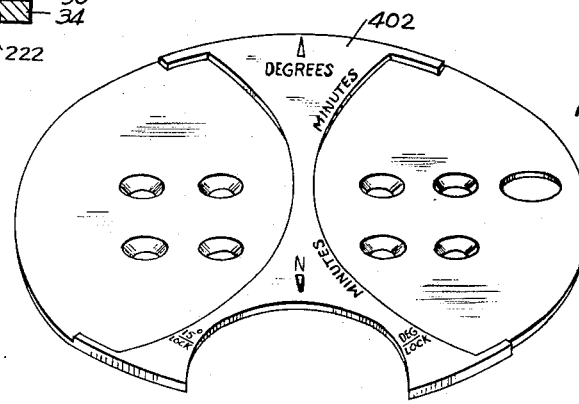
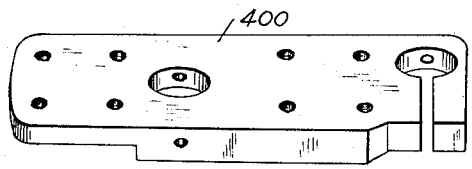
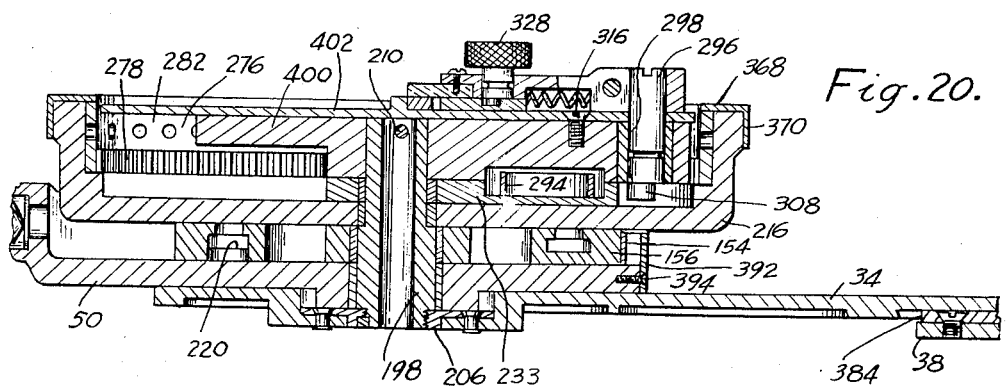
INVENTOR.
JOSEPH B. COX
BY
Buckhorn and Cheatham
ATTORNEYS Sept. 16, 1958 J. B. COX 2,851,779
ANGLE ADJUSTING MEANS
Filed May 16, 1955 9 Sheets-Sheet 6
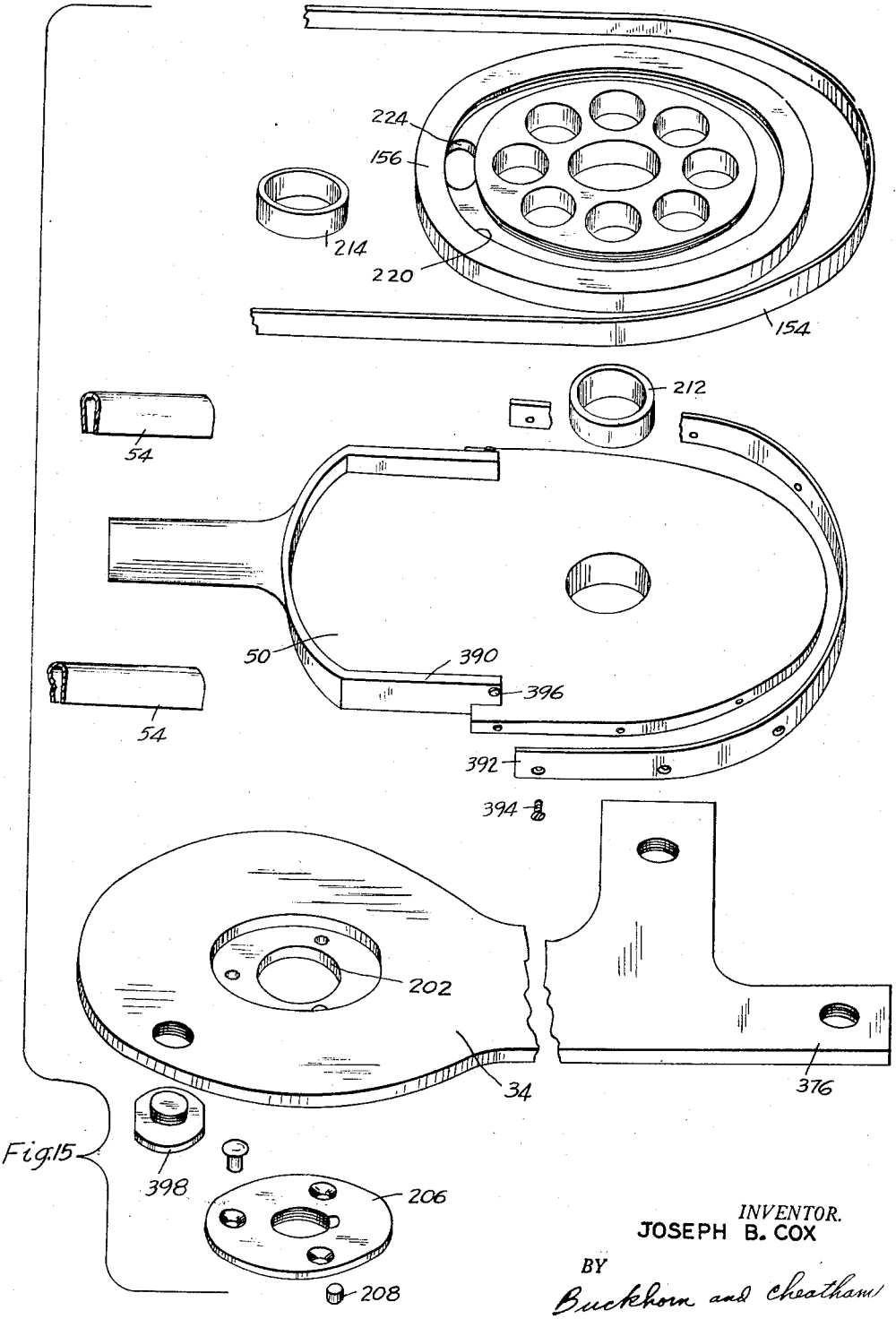
INVENTOR.
JOSEPH B. COX
BY
Buckhorn and Cheatham
ATTORNEYS

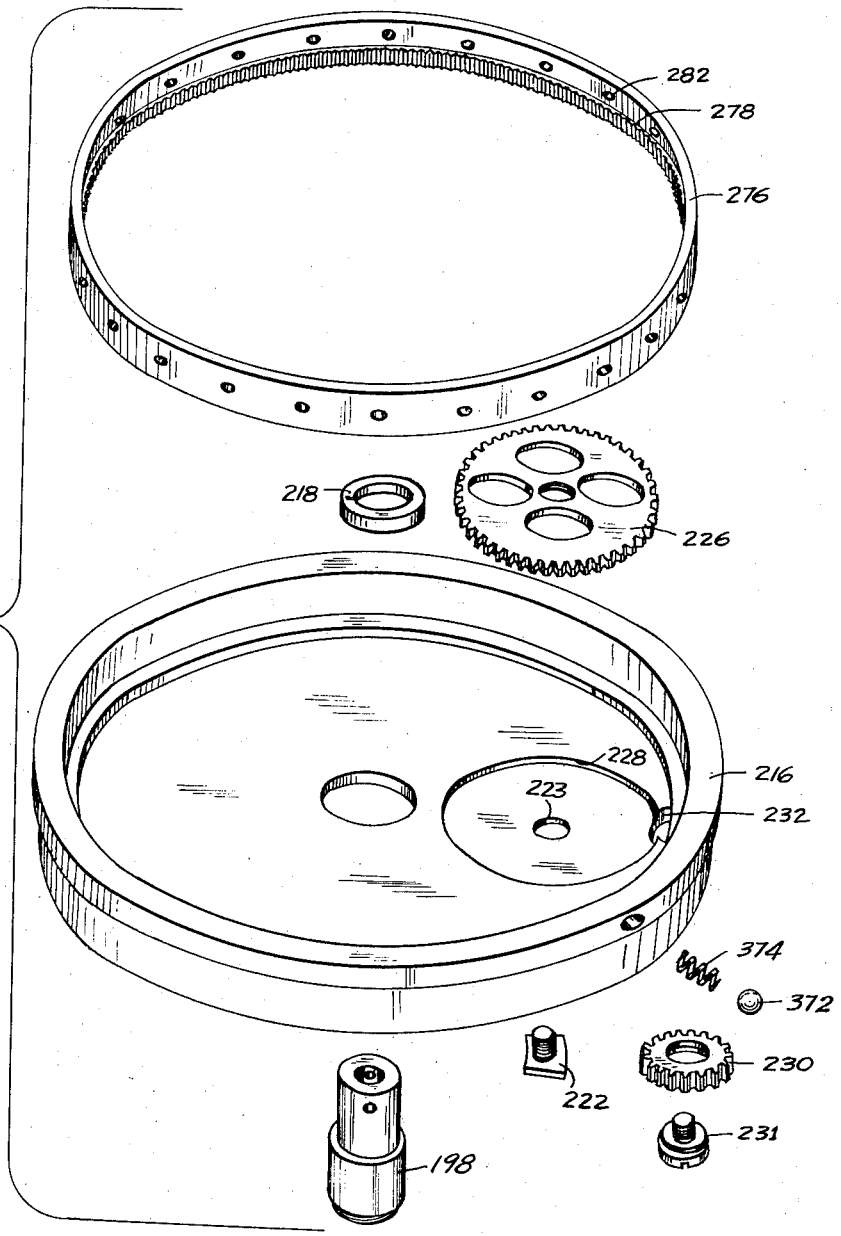

Sept. 16, 1958  J. B. COX  2,851,779
ANGLE ADJUSTING MEANS
Filed May 16, 1955  9 Sheets-Sheet 8

INVENTOR.
JOSEPH B. COX
BY
Buckhorn and Cheatham
ATTORNEYS 2,851,779
ANGLE ADJUSTING MEANS
Joseph B. Cox, Portland, Oreg.
Application May 16, 1955, Serial No. 508,451
24 Claims. (Cl. 33—79)

This invention relates to an angle adjusting means and more particularly to a mechanism by which a desired angle between two members measured in equal angular increments, which may be as small as desired, can be accurately and rapidly set without the use of verniers or other approximations, the mechanism being such that a given angular setting of the two members with respect to each other may be repeatedly and exactly duplicated and such that the two members are automatically brought to the desired exact angular setting when a series of angle setting elements are brought to approximate positions and then locked to other elements.

In various devices, such as drafting machines, surveying instruments, machine tools, various geometrical instruments, astronomical instruments, et cetera, there exists a need for an angle adjusting means which can be rapidly and accurately set to a desired angle measured in small equal angular increments which may be as small as desired. The required angular increments may be minutes, for example, in drafting machines for general purposes or may be seconds in more accurate drafting machines or may be small divisions of a second for still more precise devices such as astronomical instruments. Also, the increments may be decimal divisions of a circle or a portion of a circle. The angle adjusting means of the present invention is adaptable for use in the various devices mentioned above as well as other devices requiring accurate angular settings but for purposes of illustration a drafting machine has been selected.

The drafting machine of the present invention is preferably of the band and drum type and involves an improved head having an angle adjusting means of the type above discussed as well as improved anchor, elbow and strut structures, all of which contribute to the accuracy of the machine. Thus, the machine is provided with a head having an angle adjusting mechanism which eliminates conventional verniers but allows members carried thereby to be rapidly and freely rotated with respect to each other while at the same time enabling the members to be positively locked together at definite major angular increments and to be positively moved by a separate mechanism through small increments and locked in position to accurately bring the members to a desired relative angular position within such major increments. The machine also includes an improved counterbalance and brake structure for preventing unwanted movement of the drafting head when the machine is employed on an inclined surface.

It is therefore an object of the present invention to provide an improved angle adjusting means which enables angularly movable members to be more accurately set at desired angular positions with respect to each other.

Another object of the invention is to provide an angle adjusting means in which angularly adjustable members may be set at any desired angle with respect to each other measured in equal angular increments which may be as small as desired without the use of verniers.

Another object of the invention is to provide an angle adjusting means in which angularly adjustable members are brought to an exact angular setting by bringing a series of angle setting elements to approximate position and then locking them to other elements, the locking operation automatically bringing the angle setting elements to exact predetermined positions.

Another object of the invention is to provide an angle setting means in which angularly adjustable members are positively locked together at predetermined angular increments and can then be positively moved relative to each other within said increments by an accurate cam or cams through smaller predetermined angular increments.

Another object of the invention is to provide a drafting machine which enables the rulers carried by the head thereof to be accurately and rapidly set at a desired angular position without the employment of verniers.

Another object of the invention resides in the provision of a drafting machine in which the rulers carried by the head thereof may be positively locked at predetermined exact angular increments and may then be positively moved within such increments by an accurate cam or cams through smaller predetermined exact angular increments to a desired angular position.

Another object is to provide a drafting machine having a head provided with an angle adjusting means which enables the rulers carried thereby to be freely moved into and locked in alignment with a desired base line and then by a separate mechanism angularly moved with respect to said base line and locked at positive angular increments and then moved within such increments by smaller positive increments accurately to a desired angular position with respect to said base line without the employment of verniers, the angle adjusting means thus also providing for returning exactly to a former angular setting with respect to the base line.

Another object is to provide a drafting machine including improved band, drum, strut, brake and elbow structures which enable the rulers carried by the head to be more accurately maintained in a desired angular position during translation movement of the head of the machine.

Another object is to provide a drafting machine including improved anchor and counterbalance structure enabling the head of the machine and rulers carried thereby to be more readily moved to and maintained in adjusted position.

Another object of the invention is to provide a combination of counterbalance and braking structure which more effectively maintains the head of the machine in a desired position on an inclined or vertical drafting surface.

A further object of the invention is to provide a drafting machine involving anchor structure in which the force from tension springs is applied to the anchor arm of the machine in an improved manner so as to effectively maintain such arm in a desired position on a drafting surface positioned at an angle to the horizontal.

A still further object of the invention is to provide an improved brake structure for resisting angular movement of the head arm of the machine relative to the drafting surface to maintain the head of such machine in a desired position on a drafting surface positioned at an angle to the horizontal.

Other objects and advantages of the invention will appear in the following detailed description of preferred embodiments thereof shown in the attached drawings of which:

Fig. 1 is a plan view of the drafting machine of the present invention;

Fig. 2 is a vertical section on an enlarged scale through the anchor and counterbalance structure of the machine taken on the line 2—2 of Fig. 1;

Fig. 3 is a horizontal section taken on the line 3—3 of Fig. 2;

Fig. 4 is a vertical section on an enlarged scale through the elbow of the machine taken on the line 4—4 of Fig. 1;

Fig. 5 is a horizontal section taken on the line 5—5 of Fig. 4;

Fig. 6 is a plan view of the head of the machine on an enlarged scale with respect to Fig. 1;

Fig. 7 is a vertical section taken on the line 7—7 of Fig. 6;

Fig. 8 is a vertical section taken on the line 8—8 of Fig. 6;

Fig. 9 is a fragmentary vertical section on an enlarged scale taken on the line 9—9 of Fig. 1 showing a portion of the head and of the head arm strut and a portion of the bearing member of the head;

Fig. 10 is a fragmentary vertical section on an enlarged scale taken on the line 10—10 of Fig. 1 and illustrating the structure for attaching a ruler to the base plate of the head;

Fig. 11 is a fragmentary vertical section taken on the line 11—11 of Fig. 10;

Fig. 12 is a partial plan view of the head of the machine with parts broken away;

Fig. 13 is a vertical section taken on the line 13—13 of Fig. 12;

Fig. 14 is a partial vertical section on the line 14—14 of Fig. 12;

Fig. 15 is an isometric exploded view of a portion of the head showing the base plate, head arm bearing member and band drum;

Fig. 16 is a view similar to Fig. 15 showing the structure of the drafting head case and bearing shafts;

Fig. 19 is a plan view of a modified form of head for the machine;

Fig. 20 is a vertical section taken on the line 20—20 of Fig. 19;

Fig. 21 is an isometric view of the minute cam fulcrum member employed in the modification of Figs. 19 and 20; and Fig. 22 is an isometric view of a head cover plate employed in the modification of Figs. 19 and 20.

Figure 17:
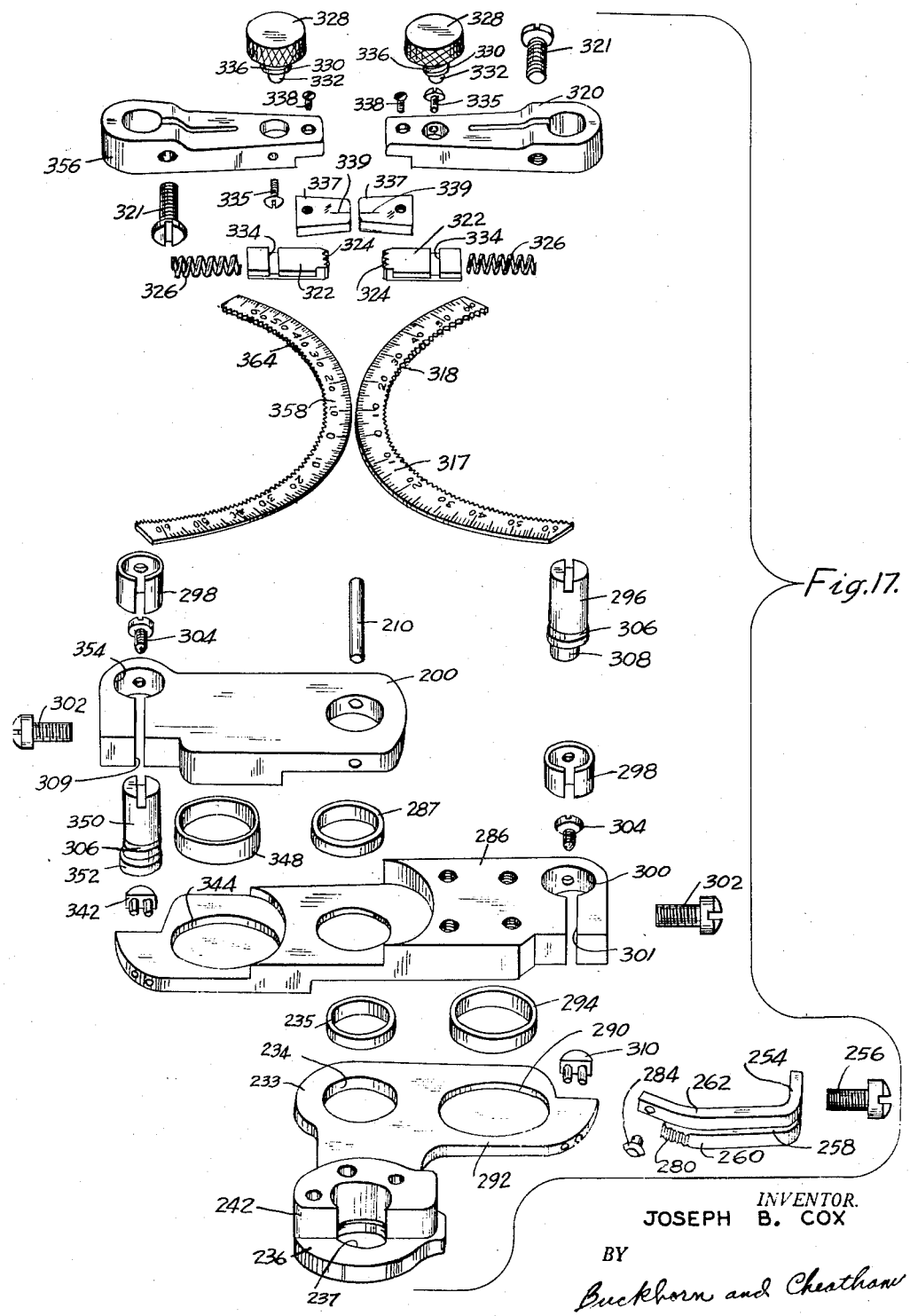
Fig. 17 is a view similar to Fig. 15 showing the minute and second setting mechanisms.
Figure 18:
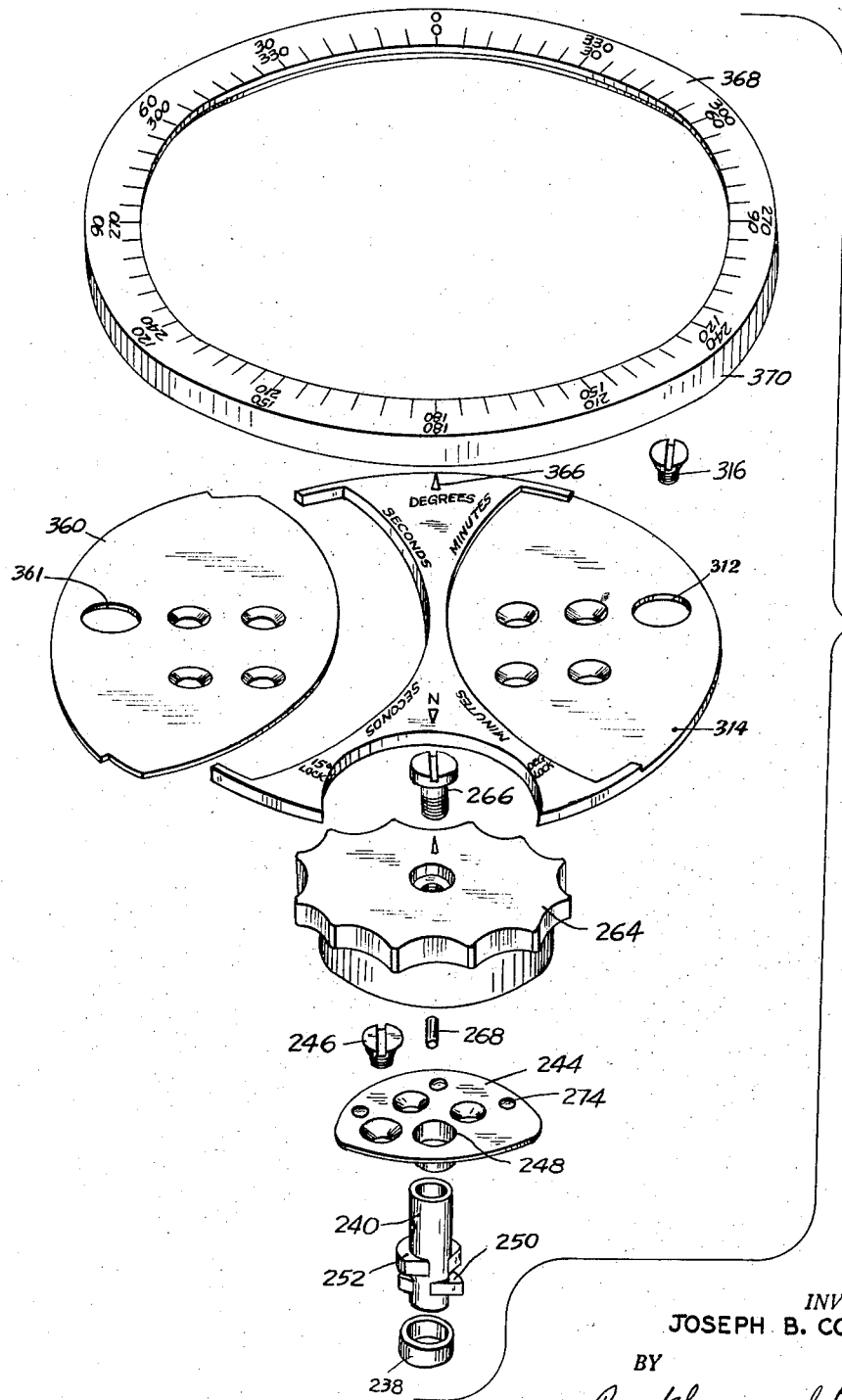
Fig. 18 is a view similar to Fig. 15 of the degree locking cam and actuating mechanism therefor and also the head cover plates and degree dial ring.

Referring more particularly to the drawings, the complete drafting machine of the present invention shown in Fig. 1 includes an anchor and counterbalance structure indicated generally at 26, an anchor arm indicated generally at 28, a drafting head supporting arm indicated generally at 30, and a drafting head indicated generally at 32, the drafting head carrying a base plate 34 to which rulers 36 and 38 are attached. The anchor arm includes an anchor arm supporting member 40 pivotally supported upon the anchor and counterbalance structure 26. The anchor arm 28 also includes an elbow member 42 and a strut which is adjustable in length, including a strut member 44 extending between the anchor arm supporting member 40 and the anchor arm elbow member 42. The anchor arm also includes a pair of band covers 46 extending between the anchor arm supporting member 40 and the anchor arm elbow member 42. The drafting head arm 30 includes an elbow member 48 pivotally secured to the elbow member 42 of the anchor arm and connected to a drafting head bearing member 50 by a strut, also of adjustable length, including a strut member 52. The drafting head arm 30 also includes a pair of band covers 54 extending between the elbow member 48 and the bearing member 50.

The drafting head 32 is rotatably supported upon the drafting head bearing member 50 and, as stated above, carries a base plate 34 to which the rulers 36 and 38 are attached. The drafting head maintains its angular position in space when moved in translation so that the rulers 36 and 38 remain parallel to themselves during pivotal movement of the anchor arm 28 with respect to the anchor and counterbalance structure 26 as well as during pivotal movement of the anchor arm 28 and drafting head arm 30 with respect to each other. Where practical, the various elements of the drafting machine are made of aluminum or similar light metal to decrease as far as possible the weight of the machine.

The anchor and counterbalance structure is most clearly shown in Figs. 2 and 3 and has the anchor arm supporting member 40 secured thereto for pivotal movement about the axis of a vertically extending anchor arm shaft 56. The anchor arm supporting member 40 is rigidly secured to the upper end of the shaft 56 by means of a screw 58 extending through the top of the anchor arm supporting member 40 and screw-threaded into the end of the shaft 56. The shaft 56 is journaled in antifriction bearings 60 positioned in opposed recesses in an anchor base member 64 and an anchor cover member 66, respectively. As shown in Figs. 2 and 3, the anchor base member 64 includes an upwardly opening casing portion 68 of generally rectangular shape in horizontal cross section. The anchor base member 64 has a clamp arm 72 extending downwardly from the bottom of the casing portion 68 and terminating in a forwardly extending member 74 parallel to the bottom of the casing portion. A clamping screw 76 is screw-threaded through a bore in the member 74 and has a clamping element 78 adjacent the bottom of the casing portion of the base member 64 so as to enable the drafting machine to be clamped to the edge of a drafting board or table top 80 shown in dotted lines in Fig. 2.

The casing portion 68 of the anchor base member 64 contains the counterbalance structure for the anchor arm 28. This counterbalance structure includes an elliptical gear 82 fixedly secured to the shaft 56 and meshing with another elliptical gear 84 secured to a vertically extending stub shaft 86 which is journaled in an antifriction bearing 60 carried in a recess (not shown) in the bottom of the casing portion 68 of the base member 64. The elliptical gear 84 has an upstanding stub shaft 88 parallel to the shaft 86 and eccentrically positioned with respect thereto along the major axis of the elliptical gear 84. A cross member 90 extending transversely of the major axis of the elliptical gear 84, when the gear is in the position shown in Fig. 3, has its center portion journaled upon the eccentric stub shaft 88. One end of each spring of a pair of tension springs 92 is connected to one of the ends of the cross member 90. The other ends of the tension springs 92 are connected to the ends of another cross member 94 positioned adjacent the opposite end of the casing portion 68 from the cross member 90. The cross member 94 is mounted upon an adjusting screw 96 extending through the center of the cross member 94 and through the end wall 98 of the casing portion 68. The adjusting screw 96 is screw-threaded through the cross member 94 and is journaled in the end wall of the casing portion 68. It will be apparent that turning the adjusting screw 96 will vary the tension of the springs 92. The cross member 94 has an upstanding portion 100 which is adapted to engage the lower surface of the cover member 66 so as to prevent rotation of the cross member 94 when the adjusting screw 96 is turned.

In the position of the elliptical gears 82 and 84 shown in Fig. 3, the counterbalance mechanism is on dead-center, and no torque is applied to the anchor arm 28 tending to rotate it with respect to the anchor and counterbalance structure 26. When the anchor arm 28 is moved from the dead-center position, in either direction, the tension springs 92 exert a torque on such arm tending to move it in the same direction. In employing the drafting machine on a horizontal drafting surface, the tension of the springs 92 is substantially completely released by the screw 96 since no counterbalance torque is required under these conditions. When, however, the drafting surface extends downwardly from the anchor and counterbalance structure toward the drafting position, which is the case when slanted-top drafting tables or even vertical drafting surfaces are employed, the force exerted by the springs 92, when the screw 96 has been properly adjusted, tends to hold the anchor arm in any position in which it is placed. The torque due to the force of gravity tending to return the anchor arm 28 to its dead-center position increases as the arm is moved from the dead-center position, and the torque exerted by the tension springs 92 through the eliptical gear arrangement also increases as the anchor arm is moved from a dead-center position. As explained in detail below, the two torques referred to can be made to balance each other in the machine of the present invention.

The cover member 66 for the anchor and counterbalance structure 26 is secured to the base member 64 thereof by means of screws 102 (Fig. 1) and is provided with an upstanding, centrally positioned, annular portion or drum 104 shown in Fig. 2. The drum 104 is provided with an annular groove providing a band-engaging surface 106 concentric with the shaft 56, which surface is engaged by one loop of an endless band 108 extending between the anchor drum 104 and an elbow drum 110 shown most clearly in Fig. 4. The anchor arm supporting member 40 (Fig. 2) has a downwardly extending annular portion 111 surrounding the drum portion 104 and forming a cover for the drum 104 and the loop of the endless band 108 thereon. The strut member 44 connecting the anchor arm supporting member 40 and the anchor arm elbow 42 is circular in cross section and has an axial bore 112 (Fig. 2) in the anchor end thereof and an axial bore 113 (Fig. 4) in the elbow end thereof. The bore 112 contains a bearing member 114 in the form of a hardened steel disc at its inner end which forms a bearing for a strut pin 116 fitting snugly into the bore 112, preferably of steel, and having a hardened point engaging the bearing member 114. The anchor end of the strut member 44 is received snugly in a bore 118 in a radially projecting portion 119 of the anchor arm supporting member 40, the pin 116 having its other end abutting against the inner end of the bore 118. The anchor end of the strut member 44 projects a short distance only into the bore 118 and forms a fulcrum about which the strut member 44 can be pivoted to raise or lower the remainder of the anchor arm, and thus the head of the drafting machine, with respect to the supporting member 40. The adjustment of the strut member 44 to thus raise or lower the head of the machine is accomplished by a pair of opposed screws 120 extending laterally through the walls of the projecting portion 119 into the bore 118 and having their ends screw-threaded into the anchor end of the pin 116. By loosening one of the screws 120 and tightening the other, it is apparent that the height of the drafting machine head relative to the drafting surface can be adjusted.

The bore 113 in the other end of the strut member 44 (Fig. 4) is internally screw-threaded and receives the end of a screw-threaded stud 122 positioned concentrically in a bore 124 in a projecting portion 126 extending radially from the anchor arm elbow member 42, the stud being secured therein by being threaded into a screw-threaded portion of the bore having a reduced diameter and held against rotation by a cross pin 127. The remainder of the bore 124 is of greater diameter than the stud 122 and receives the elbow end of the stud member 44 therein. As shown in Fig. 1, the strut member 44 contains a pair of holes 128 extending therethrough at right angles to each other. It is apparent that a pin can be inserted in one of such holes and employed to turn the strut member 44 with respect to the anchor arm supporting member 40 and the anchor arm elbow member 42, the strut member 44 being rotatably supported upon the end of the pin 116 and on the screw-threaded stud 122. It is further apparent that rotation of the strut member 44 with respect to the members 40 and 42 will shorten or lengthen the strut by reason of the screw-threaded engagement between the stud 122 (Fig. 4) and the interior of the bore 113 so as to adjust the tension of the endless band 108 extending around the drums 104 and 110.

The elbow structure between the anchor arm 28 and the drafting head arm 30 includes the anchor arm elbow member 42, the drum 110 and the drafting head arm elbow member 48, these three elements being pivotally secured together with the drum 110 between the other two elements. The anchor arm elbow member 42 has an axial bore 132 therethrough and has an antifriction bearing 136 positioned in a socket in its inner face and forming part of the bore 132. The drafting head arm elbow member 130 likewise has an axial bore 137 therethrough and an antifriction bearing 138 positioned in a recess in its inner face and forming part of the bore 137. The bearings 136 and 138 encircle the opposite ends of a hollow elbow shaft 140 having the drum 110 secured concentrically to its mid portion. The bearings 136 and 138 are held in position upon the shaft 140 by a bolt 142 extending axially through the shaft 140 and a suitable nut 144. A cover member 146 may be employed to conceal the head of the bolt 142 and close the bore 132 at the top of the anchor arm elbow member 42. The drum 110 has a band-engaging surface 150 concentric with the shaft 140 for receiving the elbow loop of the band 108, and also is provided with a band-receiving surface 152 for receiving the elbow loop of another endless band 154 extending between the drum 110 of the elbow structure and a drum 156 (Fig. 8) forming part of the drafting head structure 32. The anchor arm elbow member 42 (Fig. 4) has a depending peripheral flange 157 surrounding and forming a cover for the upper portion of the drum 110, and the head arm elbow member 48 has an upwardly extending peripheral flange 158 forming a cover for the lower portion of the drum 110.

The drum 110 also has an annular brake surface 159 concentric with the shaft 140 and positioned between the two band surfaces 150 and 152. The brake surface 159 is engaged by a brake shoe 160. The brake surface 159 may be V-shaped in vertical cross section and the cross section of the brake block 160 may be such as to provide a V-shaped brake surface conforming to the brake surface 159 of the drum except that the apex of the brake surface of the block 160 is cut away at 161. The brake block 160 has inclined end surfaces and is carried in an elongated arcuate spring retainer 162 (Fig. 5) having one end riveted to the interior of the flange 158 of the head arm elbow member 48 and a free end extending in alignment with the brake surface 159. Circumferentially spaced inclined lugs 164 are struck out of the free end of the retainer so as to engage and fit the inclined ends of the block 160. The lugs hold the blocks in position in the retainer except for movement in a direction axially of the drum 110, the latter motion being prevented by the V-shaped brake surface of the drum. The free end of the retainer 162 and the block 160 are urged by a compression spring 167 toward the braking surface 159, the spring 167 being positioned in a radially extending bore 168 in a boss 170 carried by the drafting head arm elbow member 48. The outer end of the bore 168 is closed by a screw 172 threaded into the outer end of the bore. It is apparent that turning the screw 172 will vary the braking pressure between the brake block 160 and the braking surface 159.

The strut member 52 extending between the drafting head arm elbow member 48 and the head 32 is similar in structure to the strut member 44. The elbow end of the strut member 52 has an axially extending bore 174 therein which is internally screw-threaded and which receives a screw-threaded stud 176 secured in a bore 178 in radially extending portion 180 of the drafting head arm elbow member 48. The stud 176 is threaded into a portion of the bore 178 which is reduced in diameter and internally screw-threaded, the stud being held against rotation by a cross pin 181. The stud 176 is of smaller diameter than the bore 178 and the bore 178 snugly receives the elbow end of the strut member 52. The other or head end of the strut member 52 is shown in Fig. 9, and has an axial bore 182 which receives the end of a pin 184. The pin 184 is snugly received in the bore 182 and is held therein by the cross pin 186 extending through the walls of the strut member 52. The other end of the pin 184 is snugly received in a bore 188 in a radially projecting portion 190 of the head arm bearing plate 50, the bore 188 having its inner end closed by a disc 192 of hardened steel forming a bearing for the end of the pin 184 which may be of steel and be pointed and have its point hardened. The pin 184 may have an enlarged portion 194 against which the head end of the strut member 52 rests and, as shown in Fig. 9, may be provided with a pair of holes 196 extending laterally through the enlarged mid portion and positioned at right angles to each other. It will be apparent that a pin may be inserted into one or the other of the holes 196 and employed to rotate the strut member 52 to shorten or lengthen the distance between the head bearing plate 50 and the head arm elbow member 48.

The preferred form of drafting head structure is shown in Figs. 6 to 18 inclusive and provides a plurality of mechanisms by which the base plate 34 and rulers carried thereby may be angularly adjusted with respect to the drum 156 (Fig. 8). By one combination of elements the entire head 32, including the rulers 36 and 38, may be angularly adjusted with respect to the drum 156 and locked in any desired position. By another combination of elements the rulers may be moved and locked in definite angular increments of either fifteen degrees or one degree. By still another combination of elements the rulers may be moved and locked within the larger increments in either one-minute increments or one-second increments or both. To provide for such angular adjustments, the structure of the drafting head includes a shaft 198 positioned centrally of the head and extending through the bearing plate 50 and drum 156. The shaft 198 is secured at its lower end to the base plate 34 which carries the rulers 36 and 38 and is secured at its upper end to a second cam fulcrum member 200 so that the second cam fulcrum member 200 and the base plate 34 are constrained to rotate together at all times. All of the incremental angular adjustments referred to above are made between the drum 156 and the second cam fulcrum member 200.

To secure the base plate 34 to the shaft 198, the base plate 34 has a centrally disposed bore 202 in which is positioned a flange member 206 having an outer peripheral portion riveted to the base plate. The flange member 206 has an inner bore provided with threads and is screw-threaded upon the lower end of the shaft 198 and held against rotation thereon by a key 208. The upper end of the shaft extends through a bore 207 in the second cam fulcrum member 200 and is secured to the fulcrum member by means of a taper pin 210. The bearing member 50 forming part of the drafting head arm 30 has a bore therein provided with a bushing 212 preferably of molded nylon fitting the shaft 198 so as to journal the bearing member 50 upon the shaft 198. The bearing member 50 is, therefore, freely rotatable with respect to all of the other elements of the drafting head. The drum 156 also has a central bore provided with a bushing 214 also preferably of molded nylon surrounding the shaft 198 so as to journal the drum 156 upon the shaft 198. The drum 156 is held in a fixed angular position relative to the drafting surface by the bands 154 and 108 in conjunction with the drums 110 and 104 positioned in the elbow and the anchor structure, respectively.

The head structure includes a cup-shaped casing 216 which opens upwardly and contains elements by which incremental angular adjustment of the base plate 34 with respect to the drum 156 is effected. The casing 216 is also angularly adjustable with respect to the drum 156 in order to effect an angular adjustment between the base plate 34 and the drum. Thus the casing 216 is also provided with a central bore having a bushing 218 positioned therein, the bushing 218 being mounted on the shaft 198 so as to seat against a shoulder thereon to space the casing 216 a definite distance axially of the shaft 198 from the flange member 206 of the base plate 34. The drum 156 contains an annular T-slot 220 in its upper surface. A screw 222 provided with an arcuate head (Figs. 13 and 16) and a threaded shank has its arcuate head positioned in the T-slot 220 and its shank extending upwardly through a bore 223 in the bottom of the casing. As shown in Figs. 13 and 15, a bore 224 extending upwardly from the bottom surface of the drum 156 into the T-slot 220 is provided for inserting the screw 222. The nut for the screw-threaded shank of the screw 222 is in the form of a gear 226 disposed in a circular recess 228 (Figs. 13 and 16) in the bottom of the cup-shaped casing 216 concentric with the bore 223. Another gear 230 is journaled upon the head of a screw 231 having its shank threaded upwardly into an internally threaded bore in the rim of the casing 216, the gear 230 being positioned in a downwardly opening bore 232 in the casing 216 and having a portion extending beyond the periphery of the casing 216. The gear 230 meshes with the gear 226, and it is apparent that the gear 230 may be manually rotated to rotate the gear 226 to loosen the screw 222 and allow its head to be moved in the T-slot 220 so that the casing 216 may be rotated relative to the drum 156. The gear 230 may then be rotated in the opposite direction to rotate the gear 226 and thus tighten the screw 222 in the T-slot 220 and locking the casing 216 in adjusted position with respect to the drum 156. In general, this adjustment is employed for initially aligning the ruler 36 or 38 with a desired line or with the paper being employed, after which further angular adjustments of the base plate 34 with respect to the drum 156 are made by employing elements contained in the casing 216.

The shaft 198 also has journaled thereon, within and adjacent the bottom of the casing 216, an anchor member 233 in the form of a bell crank as shown in Fig. 17, the anchor member having a bore 234 at the intersection of its arms in which is positioned a bushing 235 journaled on the shaft 198 (Fig. 8). One arm of the bell crank and anchor member 223 terminates in a bearing portion 236 having a bore 237 (Figs. 7 and 17) in which is positioned a bushing 238 (Figs. 7 and 18) receiving the lower end of increment locking cam member 240. The bearing portion 236 of the anchor member 233 has an upstanding boss 242 partially surrounding the bore 237. A bearing plate 244 is secured to the upper surface of the boss 242 by screws 246, the shape of the boss 242 being most clearly shown in Fig. 17 and the shape of the plate 244 being most clearly shown in Fig. 18. The cam member 240 is also journaled in a bore 248 in the bearing plate 244 and has a pair of cams 250 and 252 integral therewith. The cams 250 and 252 are positioned between the bearing portion 236 of the anchor member 233 and the bearing plate 244 so as to be partly surrounded by the boss 242.

As shown most clearly in Figs. 12 and 17, the boss 242 has a spring locking element 254 secured thereto by a screw 256, the locking element 254 being generally L-shaped and being split longitudinally at 258 to provide a pair of independently operable spring locking members 260 and 262 extending adjacent the cams 250 and 252, respectively. The cams 250 and 252 are arranged on the cam member 240 such that turning of the cam member 240 clockwise in Fig. 12 urges the locking member 260 outwardly toward the inner periphery of the casing 216 and turning of the cam member 240 counterclockwise in Fig. 12 urges the locking member 262 outwardly toward the inner periphery of the casing 216. Turning of the cam member 240 is accomplished by a knob 264 (Figs. 6, 7 and 18) secured to the upper end of the cam member 240, the knob having a bore fitting the cam member and being secured to the cam member by a screw 266 extending axially through the knob into a screw-threaded bore in the upper end of the cam member 240. A cross pin 268 is provided to prevent rotation of the knob relative to the cam member, the cross pin engaging notches (not shown) in the lower central portion of the knob 264. The knob 264 also has a downwardly opening bore adjacent its periphery in which is positioned a compression spring 270 and a ball detent 272 which engages in detent recesses 274 (Fig. 18) in the top of the bearing plate 244 in three positions corresponding to a neutral position, a degree lock position and a fifteen degree lock position.

The degree lock spring locking member 260 of the locking element 254 and the fifteen degree locking member 262 thereof cooperate with an increment ring 276 press-fitted into the upper portion of the casing 216. The inner periphery of the ring 276 adjacent the lower portion thereof is provided with a plurality of accurately formed triangular teeth 278 having a circumferential pitch of one degree. The spring locking member 260 of the increment locking element 254 likewise has a plurality of accurately formed teeth 280 also having a circumferential pitch of one degree. The teeth 280 engage with the teeth 278 on the ring 276 when the cam member 240 is turned by the knob 264 clockwise into degree lock position. In this position the cam 250 firmly presses teeth 280 into contact with the teeth 278, both the spring locking member 260 and the increment ring 276 being preferably made of steel with the teeth 278 and 280 hardened. The anchor member 233 may be indexed about the shaft 198 through increments of one degree or multiples thereof and locked in adjusted position. The indexing is accomplished by moving the knob 264 to its neutral position, using the knob to turn anchor member 233 about its bearing on the shaft 198 and then turning the knob to its degree lock position. The anchor member 233 is connectde to the second cam fulcrum member 200 by other elements within the casing 216, as described below, such that the base plate 34 rigidly connected to the second cam fulcrum member 200 by means of a shaft 198 can be indexed about the casing 216, and therefore with respect to the drum 156, in one degree increments or multiples thereof.

The increment ring 276 in the interior of the casing 216 is also provided in its inner periphery with a plurality of holes 282, the holes 282 being accurately spaced fifteen degrees apart circumferentially of the ring. The upper spring locking member 262 of the locking element 254 is provided with a frusto-conical projecting member 284 extending outwardly therefrom. The member 284 projects radially of the casing 216 so as to be adapted to be inserted into one of the holes 282 when the cam member 240 is turned counterclockwise in Fig. 12 by the knob 264 into the fifteen degree lock position so as to cause the cam 252 to engage the spring locking member 262 and move it radially outward. The anchor member 233 may thereby be locked to the casing 216 at fifteen degree increments as well as one degree increments and this enables the base plate 34 carrying the rulers 36 and 38 to be indexed with respect to the drum 156 in fifteen degree increments since the anchor member 233 is connected to the second cam fulcrum member 200 by other elements in the casing 216 as described below.

A minute cam fulcrum 286 (Figs. 7, 8 and 17) is also journaled upon the shaft 198 above the anchor member 233. That is to say, the minute cam fulcrum member 286 has a central bore therein in which a bushing 287 is positioned, the bushing 287 being journaled upon the shaft 198. The minute cam fulcrum member 286 has an elliptical recess 288 (Fig. 8) in its lower surface adjacent one end thereof which cooperates with a similar recess 290 (Figs. 8 and 17) in the upper surface of a cam follower arm 292 of the anchor member 233 to form a spring receiving chamber. A spring 294 in the form of a circular band of spring metal is positioned in the chamber formed by the two recesses and is prestressed by positioning the two recesses out of alignment circumferentially of the shaft 198 during the assembly of the drafting head such that the minute cam fulcrum member 286 and the anchor member 232 are urged by the spring toward a position which the recesses 288 and 290 are in alignment.

The minute cam fulcrum member 286 can be rotated relative to the anchor member 233 about the shaft 198 in one minute increments against the force of the spring 294 through an angular distance of two degrees by means of a cam member 296 journaled in a bushing 298 positioned in a bore 300 in one end of the minute cam fulcrum member 286. The bushing 298 is preferably of molded nylon and may be split as shown in Fig. 17. The bore 300 may have a slot 301 extending thereinto and a clamp screw 302 may be threaded into the minute cam fulcrum member across the slot 301 and employed to clamp the bushing 298 in position about the cam member 296 so as to provide an accurate bearing for the cam member 296 which is adjustable in order to eliminate play between the cam member 296 and the minute cam fulcrum member. A screw 304 extending through the wall of the bore 300 in threaded engagement therewith and then passing through a bore in the bushing 298 into engagement with an annular groove 306 in the cam member 296 may be employed to prevent axial displacement of the bushing 298 and the cam member 296. The cam member 296 has an accurately formed cam 308 on its lower portion and the cam 308 engages a cam follower 310 carried by the anchor member 233, both the cam 308 and the cam follower 310 preferably being of hardened steel.

The cam member 296 projects upwardly from the minute cam fulcrum member 286 through a bore 312 in a cover plate 314 (Figs. 8 and 18) secured to the upper surface of the minute cam fulcrum member 286 by means of screws 316. The cover plate 314 has secured thereto, for example, by soldering or brazing, a graduated dial member 317 (Figs. 8 and 17) preferably of stainless steel and positioned concentric with the bore 312. The dial member 317 has a series of accurately formed teeth 318 on the inner periphery thereof, the teeth 318 having a circumferential pitch equivalent to an angle of one minute when referred to the cam 308. The cam member 296 is rotated by a minute pointer arm 320 clamped thereto by a screw 321 and having a spring pressed locking member 322 sliding in a slot extending longitudinally of the arm 320 and positioned in the lower surface of the arm adjacent the end thereof remote from the cam member 296. The sliding locking member 322 is preferably of hardened steel and has a plurality of accurately formed teeth 324 (Fig. 17) in its end remote from the cam member 296, the teeth 324 having the same pitch as the teeth 318 on the dial member 317 and being adapted to engage such teeth. The sliding locking member 322 is urged toward the minute dial member 317 by means of a spring 326 positioned in a longitudinally extending slot in the bottom of the arm 320 (Fig. 8). The locking member 322 may be retracted against the force of the spring 326 by means of a knob member 328 having a shank 330 journaled in a vertically extending bore in the arm 320 and having an eccentrically disposed, axially extending projection 332 engaging in a laterally extending slot 334 in the upper surface of the locking member 322. The knob member is held against longitudinal displacement by a screw 335 (Fig. 17) extending laterally through one side of the arm 320 into an annular groove 336 in the shank of the knob member. The minute pointer arm 320 terminates at its free end in a magnifying sight glass 337, which fits into a recess in the end of the minute pointer arm and extends outwardly over the minute scale member 317. The sight glass 337 may be of a suitable plastic and is held in position by a screw 338. It has an index line 339 on its lower surface to serve as a reference index with respect to the graduations on the minute scale member 317.

The knob 328 may be turned in either direction to cause its eccentric projection 332 to retract the slider 322 against the compressive force of the spring 326 and thus disengage the teeth 324 on the end of the sliding member 322 from the teeth 318 on the minute scale member 317. The entire arm 320 may then be pivoted about the cam member 296 to rotate such cam member. The spring 294 in the recesses 288 and 290 in the minute cam fulcrum member 286 and the anchor member 233, respectively, urges the cam follower 310 (Figs. 14 and 17) on the anchor member 233 against the cam 308 on the lower end of the cam member 296. The cam member 308 has an accurately formed cam surface such that rotation of the minute pointer arm 320 through one graduation on the scale member 317, i. e., the distance between the teeth 318 on such scale member produces a relative rotation between the minute cam fulcrum member 286 and the anchor member 233 equal to one minute of arc. The structure just described thus constitutes an angular distance reducing means for converting the angular distance between the teeth to smaller angular increments. The range of movement of the minute cam pointer lever 320 is such that the relative movement between the minute cam fulcrum member 286 and the anchor member 233 is plus or minus one degree from a central position or a total range of two degrees and the scale member 317 is accordingly graduated to sixty minutes in either direction from such central position. To relative motion between the minute cam fulcrum member 286 and the anchor 233 is translated to the second cam fulcrum member 200 by means described below and thus to the base plate 34.

The minute cam fulcrum member 286 also has a cam follower 342 secured to its end opposite the cam member 296 and projecting circumferentially therefrom. The minute cam fulcrum member 286 also contains an upwardly opening spring receiving recess 344 (Fig. 8) adjacent a similar recess 346 in the lower surface of the second cam fulcrum member 200 to form a spring receiving chamber. A spring 348 in the form of a band of resilient metal is positioned in the chamber and the spring 348 functions in a manner entirely analogous to that of the spring 294 between the minute cam fulcrum member 286 and the anchor member 233. A second cam member 350 is journaled in the end of the second cam fulcrum member 200 and has a cam 352 at its lower end which engages the cam follower 342 on the minute cam fulcrum member 286. That is to say, the second cam fulcrum member 200 has a bore 354 in which is received a split bushing 298 which may be identical with the similar bushing 298 employed in the bore 300 of the minute cam fulcrum member, the bushing 298 and the cam 350 being held in position by a screw 304 extending radially through the wall of the bore 354, and through the bushing 298 into an annular groove 306 in the second cam member 350. The second cam fulcrum member may also be provided with a slot 309 and clamp screw 302 for clamping the bushing 298 in position around the cam member 350 to prevent play between the cam member and the second cam fulcrum member 200.

The upper end of the cam member 350 has a second pointer arm 356 attached thereto. The second pointer arm 356 is identical to the minute pointer arm 320 and may include the slider member 322, compression spring 326 and knob 328 having an eccentric projection 332 for retracting the slider member 322. The second pointer arm 356 may likewise be provided with a magnifying sight glass 337 overlying a second dial member 358 secured to another cover plate 360 (Figs. 8 and 18), for example, by soldering or brazing, the cover plate 360 being secured to the upper surface of the second cam fulcrum member 200 by screws 316 and having a bore 361 through which the cam member 350 extends. The slider 322 for the second pointer arm 356 also has accurately formed teeth 324 at its free end for engagement with similarly accurately formed teeth 364 on the second dial member 358. The second cam member 350 may thus be rotated in increments by the second cam pointer arm 356 to cause relative movement between the second cam fulcrum member 200 and the minute cam fulcrum member 286. The second cam is accurately formed so that movement of the second pointer arm 356 through an angular distance of one graduation on the second dial member 358, i. e., the distance between two adjacent teeth 364 thereon causes relative angular movement between the second cam fulcrum member 200 and the minute cam fulcrum member 286 equal to one second of arc. The range of movement between the second cam fulcrum member 200 and the minute cam fulcrum member 286 is plus or minus one minute or a total movement of two minutes. The second dial member 358 is accordingly graduated in seconds for an angular distance equivalent to plus or minus one minute. The relative angular movement between the second cam fulcrum member 200 and the minute cam fulcrum member 286 adds or subtracts from the relative angular movement between the minute cam fulcrum member and the anchor member 233. Since the anchor member may be clamped to the casing 216 in one degree angular intervals as described above and thus to the drum 156, the rulers 36 and 38 carried by the base plate 34 which is secured to the second cam fulcrum member 200 can be set at any angle measured in seconds without the use of verniers.

The cover plate 314 has a degree index 366 (Fig. 6) at its periphery opposite the knob 264 and adjacent the graduations on a degree ring 368 mounted on the casing 216 (Fig. 7). The degree ring 368 is angular in horizontal cross section and has degree graduations on the upper surface of an inwardly extending annular portion. The degree ring also has an outer flange portion 370 depending therefrom and fits over the upper edge of the casing 216. The degree ring 368 is frictionally held in position by spring-pressed ball members 372 positioned in radially extending bores in the rim of the cup-shaped casing 216, the balls 372 being spring pressed outwardly by compression springs 374 positioned between the balls 372 and the increment ring 276 in the interior of the casing. The degree ring 368 is thus frictionally and detachably held on the upper rim of the casing 216 and may be rotated with respect to such casing. Ordinarily the degree ring 368 will be left in a single adjusted position during a given drafting operation but the adjustment just discussed is useful where two lines on the same drawing are at an angle to each other measured in even degrees and it is desired to lay out measured angles from each of the lines.

The structure by which the rulers 36 and 38 are attached to the base plate 34 is most clearly shown in Figs. 10 and 11. The means for attaching the rulers 36 and 38 are identical and only the means for attaching the ruler 38 will be described. The arm 376 of the base plate 34 to which the ruler 38 is attached has in its lower surface a dove tail slot 378 extending longitudinally of the arm. The ruler 38 has attached to its upper surface by means of the screws 380 and 382 a dove tail plate 384, the screws extending through holes in the dove tail plate and being received in screw-threaded holes in the ruler. The dove tail plate 384 and slot 378 have a slight taper longitudinally thereof with the wider portion of the slot and plate facing toward the open end of the slot. The plate 384 is received snugly within the slot 378 and is held in position by a clamp screw 386 threaded through a bore in the arm 376 of the base plate 34 and having its lower end in contact with the plate 384. By loosening the screw 386, ruler 38 and plate 384 may easily be withdrawn from or installed on the arm 376. The slots in the two arms of the base plate 34 are approximately ninety degrees to each other and the hole in one or both of the rulers 38 and 36 through which the screw 382 extends has sufficient width that one of the rulers may be accurately positioned at an angle of ninety degrees to the other.

The bands 108 and 154 (Figs. 2, 4 and 5) which hold the head drum 156 and elbow drum 110 in the same angular position in space as the anchor drum 104 are enclosed in band covers 46 and 54, respectively. These band covers may be of thin sheet metal or sheet plastic and as shown in Fig. 15 may be U-shaped in cross section. As shown in Fig. 5, the ends of band covers 54 extend into slots 388 in the head arm elbow member 48 and the band covers 46 are similarly positioned in slots (not shown) in the anchor arm supporting member 40 and the anchor arm elbow member 42. The drafting head ends of the band covers 54 are held between an upstanding flange 390 (Fig. 15) on the bearing plate 50 forming part of the drafting head arm and a band cover 392 secured to the periphery of the bearing plate 50 by screws 394. The ends of the band cover 392 and the flanges 390 form slots for receiving the ends of the band covers 54, the band covers being retained in such slots by projections 396 on the flanges 390. It will be apparent that the anchor arm supporting member 40, the anchor arm elbow member 42 and the head arm elbow member 48 may also have projections similar to the projections (not shown) in the slots 388 (Fig. 5) thereof. In order to facilitate movement of the drafting head 32 over a drafting surface the base plate 34 thereof may be provided with a skid button 398 (Figs. 7 and 15), preferably of molded plastic material, on its lower surface, the button being screw-threaded into the base plate.

The operation of the drafting machine of Figs. 1 to 18 is as follows. The machine is attached to the top edge of a drafting board or to the top edge of a drafting table by the clamping screw 76 of the anchor and counterbalance structure 26 so that the anchor arm 28 extends parallel to the end of the drafting board or table when the counterbalance mechanism is in neutral or dead-center position. The height of the drafting head can be adjusted by the screws 120 (Fig. 2) until the skid button 398 (Fig. 7) on the head 32 rests lightly upon the drafting surface. The bands 108 (Fig. 2) and 154 (Fig. 5) are placed under sufficient tension by rotating the strut members 44 and 52 to cause the head drum 156 to remain in the same angular position in space as the anchor drum 104 such that the entire mechanism of the head 32 tends to remain in a fixed horizontal angle in space as the head is moved in translation even though the anchor arm 28 rotates about the anchor and counterbalance structure 26 and the two arms 28 and 30 move angularly with respect to each other at the elbow.

The brake structure in the head arm elbow member 48, including the brake shoe 160, tends to lock the head arm 30 to the elbow drum 110 so that this arm also tends to maintain a fixed angular position in space as the anchor arm 28 is rotated about the anchor shaft 56. That is to say, the two arms of the machine also pivot relative to each other at the elbow unless an external force is applied to cause relative movement between the elbow drum 110 and the brake shoe 160. When the brake locks the head arm 30 to the elbow drum 110 the entire mass of the head arm 30, including the head and the rulers 36 and 38, acts as if it were concentrated at the axis of the elbow shaft 140. This can be readily understood when it is pointed out that swinging of the anchor arm 28 from its neutral or dead-center position in either direction will elevate the center of gravity of the head arm 30 and mechanisms carried thereby whenever the machine is employed on a drafting surface sloping downwardly toward the operator or on a vertical drafting surface. The counterbalance structure of the machine may therefore be employed to counterbalance the entire weight of the head arm 30, including the head 32, and its associate mechanisms as well as counterbalancing the weight of the anchor arm.

The torque to be balanced by the counterbalance mechanism increases directly as the sine of the angle, through which the anchor arm 44 is swung out of its neutral position. The counterbalancing torque should also increase directly as the sine of this angle. Spring mechanisms which will apply a torque increasing as the sine of the angle are difficult to design and are usually of large size. For example, the necessary sine function of torque can be approximated by a long tension spring connected to a lever arm aligned with and extending in the direction of the axis of the spring in its dead-center position. The spring must, however, be of sufficient length that the increasing angularity between the resulting direction of the axis of the spring and its original direction is not significant and also so that the variation of the spring force due to the decrease in elongation of the spring is not significant. In the counterbalance structure shown in Figs. 2 and 3, relatively short springs 92 in conjunction with elliptical gears 82 and 84 are employed to produce an effective counterbalancing force. The arrangement is such that the effective lever arm through which the spring force acts upon the shaft 56 rapidly increases. That is to say, the effective radius of the gear 84 becomes less and the effective radius of the gear 82 becomes greater so as to produce an increase in mechanical advantage as the anchor arm 28 is moved from its central position. There is, however, a decrease in spring force due to a shorter length of the tension springs 92 when the anchor arm 28 moves from its central position. Also the angular displacement of the springs 92 due to lateral movement of the cross arm 90 causes the lever arm applied through the stub shaft 88 on the gear 84 to increase at a rate less than that of a sine function. The elliptical gear arrangement compensates for the two effects just mentioned such that torque applied to the anchor shaft 56 from the springs 92 closely approximates the necessary sine function so as to effectively counterbalance the effect of gravity upon the mass of both the anchor arm 28 and the head arm 33.

When the drafting surface is horizontal the adjusting screw 96 (Fig. 3) of the anchor and counterbalance structure may be loosened until substantially no torque is applied by the springs to the anchor shaft 56. Also, the adjusting screw 172 (Fig. 5) for the brake shoe 160 may be loosened until very little or no braking effort is produced between the head arm elbow member 48 and the drum 110. For a slanted drafting surface or vertical drafting surface, the adjusting screws 96 and 172 can be tightened just sufficiently to cause proper counterbalancing of the anchor arm 28 and of the head arm 30 and associated apparatus.

The lengths of the anchor arm 28 and the head arm 30 can be adjusted by turning the strut members 44 and 52, respectively, so as to tighten bands 108 and 154, respectively, and produce a correct tension therein so as to prevent slippage between the bands and the various drums. In this connection, the various drums are preferably made of aluminum or similar light metal and their band receiving surfaces 106, 150, 152 and 157 are preferably given an anodizing treatment to assist in preventing slippage between such surfaces and the bands. The bands 154 and band 108 are preferably made of endless strips of steel and are preferably given a bluing treatment on their surfaces so as to also assist in preventing slippage between the bands and the drums. A particularly suitable material for the brake shoe 160 is molded nylon.

The rulers 36 and 38 carried by the base plate 34 of the drafting head, may be initially aligned with a base line or other index such as the edge of a sheet of drafting paper by rotating the casing 216 of the drafting head relative to the drum 156. This is accomplished by rotating the drum gear 230 (Figs. 12 and 13) to rotate the gear nut 226 on the screw 222 which has its head positioned in the T-slot 220 in the drum 156 to loosen the head of the screw in the slot. The casing 216 is thereby released from the drum 156 and is rotatable around the shaft 198. Prior to aligning the rulers with a desired line, by rotating the casing 216, the knob 264 will ordinarily be employed to lock the anchor member 233 in the casing in one of the fifteen degree lock positions afforded by the holes 282 (Fig. 12), the projection 284 on the spring lock member 262 entering one of the holes 282. Also at this time the minute pointer arm 320 and the second pointer arm 356 (Fig. 6) will ordinarily be in their zero positions and the degree ring 368 will also ordinarily have its zero graduation opposite the degree index 366 on the cover plate 314. By then manually aligning the ruler 36 or 38 with a desired line on the drawing or with the edge of the paper being employed and tightening the gear nut 226, the instrument is in the proper adjustment for use in a drafting operation. It will be apparent that the degree dial ring 368, the minute pointer arm 320 and the second pointer arm 356 may be set to read any desired angle during the initial aligning operation and that the anchor member 233 may be locked to the casing 216 by the spring locking member 260 instead of the spring locking member 262 during such operation in order to align the rulers of the machine with a line at such desired angle. In any event the drafting head may then be moved over the drafting surface with the glide button 398 of the head in contact with such surface and the rulers 36 and 38 remain parallel to their previous position.

By releasing the locking engagement between either of the spring locking members 260 or 262 and the locking ring 276 in the casing 216 by turning the knob 264 to its neutral position, the base plate 34 may be rotated with respect to the drum 156. That is to say, shaft 198 and all the angle setting elements contained in the casing 216, including the second cam fulcrum member 200 attached to the shaft 198, become freely rotatable with respect to the casing 216. All of such elements rotate together since the spring 294 in conjunction with the cam 308 and cam follower 310 effectively locks the minute cam fulcrum member 286 to the anchor member 233 and the spring 348 in conjunction with the cam 352 and cam follower 342 effectively locks the second cam fulcrum member 200 to the minute cam fulcrum member 286, the second cam fulcrum member 200 being fixedly secured to the upper end of the shaft 198 which has the base plate 34 fixedly secured to its lower end. The above elements including the base plate 34 and rulers 36 and 38 may be locked to the casing 216 and therefore the drum 156 in fifteen degree increments by rotating the knob 264 to its fifteen degree lock position while the projection 284 (Fig. 12) is in alignment with one of the holes 282 in the ring 276, the cam 252 causing the projection 284 to enter one of the holes. By rotating the knob 264 in the opposite direction from its neutral position to the degree lock position, the elements contained in the casing 216 as well as the base plate 34 may be locked to the casing 216 in one degree increments. Turning of the knob to the degree lock position causes the cam 250 to force the toothed locking member 260 into engagement with the increment ring 276 so that the teeth 280 of the locking member 260 engage the teeth 278 on the ring. The locking member 260 need be brought into an approximate circumferential position only with respect to the increment ring, i. e., within plus or minus one half degree, before the knob is turned to degree lock position as the triangular shape of the teeth 270 and 280 provides a camming action which brings the locking member into exact circumferential position with respect to the increment ring.

If the desired angle is not measured in equal degrees, the base arm 34 may then be moved relative to the casing 216 through fractions of a degree by withdrawing the sliding locking member 322 of the minute pointer lever 320 from engagement with the minute scale member by rotating the corresponding knob 328 and then moving the minute pointer lever 320 to rotate the cam member 296. Rotation of the cam member 296 rotates the cam portion 308 thereof (Fig. 8) with respect to the cam follower 310 (Fig. 12), the cam member 296 being journaled in the minute cam fulcrum member 286 and the cam follower 310 being carried by the anchor member 233. Relative movement between these two last-named members due to rotation of the cam 308 is resisted by the spring 294 positioned in the recesses 290 and 288 in the anchor member 233 and minute cam fulcrum member 286, respectively. Such relative motion between the anchor 233 and the minute cam fulcrum member 286 is translated to the second hand fulcrum member 200 and thus to the base plate 34 and rulers carried thereby. The teeth 318 and 324 on the minute scale member 317 and sliding locking member 322 are also triangular in form and release of the knob 328 causes the spring 326 to press the sliding locking member into engagement with the minute scale member 317 and cause the teeth of such members to produce a camming action bringing the minute pointer lever and cam member 296 into an exact position relative to the minute scale member even though the minute pointer lever was in approximate position only when the knob 328 was released. If a desired angle is not measured in even minutes, relative movement between the minute cam fulcrum member 286 and the second cam fulcrum member 200 may be produced by the cam 352 acting against the cam follower 342 (Fig. 17). The cam 352 may be rotated by rotating the second pointer lever 356 (Fig. 6) carried by the cam member 350. As in the case of the minute pointer lever 320, the second pointer lever 356 and its associated member 350 and cam 352 are brought into exact position relative to the second scale member 358 by the camming action of the triangular teeth on the second scale member and the sliding locking member 322.

It is apparent from the above that rulers 36 and 38 may be moved through angles measured in even degrees by manipulation of the knob 264 to lock and unlock the anchor member 233 from the degree ring 276 of the casing 216. The number of degrees which the rulers are rotated relative to the casing 216 are indicated by the graduations on the degree ring 368 in conjunction with the degree index 366 on the cover plate 314. If a desired angle does not contain an even number of degrees, the minute cam pointer lever 320 may be manipulated to add or subtract a definite number of minutes from the degree setting by rotating the knob 328 thereon to withdraw the tooth slider member 322 from engagement with the teeth 318 on the minute scale member 317 and then rotating the lever 320 the desired number of minutes in the correct direction as indicated by the index mark 339 on the transparent member 337 in conjunction with the scale on the minute scale 317. Similarly, if the angle desired is not measured in even minutes, the second pointer lever 356 may be moved to a desired second indication in the same manner that the minute pointer lever 320 is moved to a desired minute indication to add or subtract a definite number of seconds. The above adjustments can obviously be made in any desired order and by employing the various adjustments independently the rulers can be moved a given number of seconds, a given number of minutes or a given number of degrees from the last setting. All of the scales are of sufficient size to be easily read and in no case is it necessary to estimate distances in fractions between graduations and verniers are completely eliminated. Furthermore, the various members may always be reset exactly to any prior setting.

A modified type of head is shown in Figs. 19 to 22 inclusive. The major difference between the head of these figures and the head shown in Figs. 8 to 18 inclusive is the elimination of the mechanism for setting the rulers to increments of one second. A modified form of minute cam fulcrum member 400 is substituted for both the second cam fulcrum member 200 and the minute cam fulcrum member 286 shown in Fig. 8. The minute cam fulcrum member 400 of Figs. 20 and 21 is secured directly to the shaft 198 by the pin 210 so that relative angular movement between the anchor member 233 and the minute cam fulcrum member 400 is transmitted directly to shaft 198 when the anchor member 233 is locked to the casing 216. Also, a single piece cover plate 402 may be employed instead of two cover plates 314 and 360, the cover plate 402 being directly secured to the minute cam fulcrum member 400. No second cam member 350 with its cam 352 is employed and the minute cam fulcrum member 400 is therefore not provided with a cam follower at its end opposite the minute cam member 296. Also, the cover plate 402 has no aperture for the second cam member 350 and the second cam pointer lever 356 and associated apparatus and the second scale 358 are eliminated. Otherwise the modified head is the same as the head shown in Figs. 8 to 18 and similar elements have been given similar reference numbers.

The operation of the drafting machine containing the modified head shown in Figs. 19 to 22 is entirely similar to the machine having the head shown in Figs. 8 to 18 except that rulers 36 and 38 can be moved through angles measured in even minutes only by the positive angle setting mechanism described since no mechanism for moving the rulers in increments of a second within the minute increments is provided. The machine of Figs. 19 to 22 is less expensive to build than that of Figs. 8 to 18 and measurement of angles to one minute is adequate for many drafting requirements, the machine of Figs. 8 to 18 being intended from precise engineering drafting.

While the angle adjusting mechanism incorporated in the drafting head of the present invention has major utility in a drafting machine, it is apparent that it has utility in substantially any enironment where it is desirable to accurately set two angularly movable members relative to each other at any desired angle measured in predetermined even angular increments of any value, however small, one of the major advantages of such mechanism being its capability of being accurately returned to the same angular setting without error.

I claim as my invention:

1. Angle adjusting means comprising first and second members angularly movable with respect to each other about a pivotal axis, a third member angularly movable about said pivotal axis with respect to said members, first locking means including angularly spaced first locking elements for locking said third member to said first member at predetermined equal angular increments, and second locking means including angular spaced second locking elements for locking said second and third members together at predetermined smaller equal angular increments within the first mentioned increments, said second locking elements being spaced from each other an angular distance greater than said smaller angular increments, said second locking means including angular distance reducing means independent of said first locking elements for converting the angular distance between said second locking elements to said smaller angular increments.

2. Angle adjusting means comprising first and second members angularly movable with respect to each other about a pivotal axis, a third member angularly movable about said axis with respect to said members, first locking means including angularly spaced first locking elements for locking said first and second members together at angular positions spaced from each other by an angle of one degree, and second locking means including means for moving said second and third members relative to each other through steps of even minutes and including angularly spaced second locking elements for locking said second and third members relative to each other at increments of one minute, said second locking elements being spaced from each other an angular distance greater than one minute, said second locking means including angular distance reducing means independent of said first locking elements for converting the angular distance between said second locking elements to one minute.

3. Angle adjusting means comprising a first member and a second member angularly movable with respect to each other about a pivotal axis, a third member angularly movable with respect to said first member about said pivotal axis, first locking means including angularly spaced first locking elements on said first and third members to lock said first and third members together at predetermined equal angular increments, said locking elements being shaped to bring said first and third members to exact positions relative to each other upon engagement of said locking elements, second locking means between said second and third members for holding said second and third members relative to each other at predetermined smaller equal angular increments including relatively movable members having angularly spaced engageable second locking elements thereon, the last-mentioned locking elements being shaped to bring said relatively movable members to exact position relative to each other upon engagement of said last-mentioned locking elements, said second locking elements being spaced from each other an angular distance greater than said smaller angular increments, said second locking means including angular distance reducing means independent of said first locking elements for converting the angular distance between said second locking elements to said smaller angular increments.

4. Angle adjusting means comprising a first member and a second member angularly movable with respect to each other about a pivotal axis, an anchor member angularly movable with respect to said first member about said pivotal axis, first locking means including first locking elements spaced one degree apart on both said anchor member and said first member to lock said anchor member to said first member at angular increments of even degrees, and second locking means between said anchor member and said second member including means for angularly moving said anchor member and said second member relative to each other and including angularly spaced second locking elements holding said anchor member and said second member relative to each other at angular increments of even minutes, said second locking elements being spaced from each other an angular distance greater than one minute, said second locking means including angular distance reducing means independent of said first locking elements for converting the angular distance between said second locking elements to one minute.

5. Angle adjusting means comprising a first member and a second member angularly movable with respect to each other about a pivotal axis, an anchor member angularly movable with respect to said members about said pivotal axis, first locking means including angularly spaced first locking elements for locking said anchor member to said first member at predetermined equal angular increments, a fulcrum member also angularly movable with respect to said anchor member about said pivotal axis, second locking means including means between said anchor member and said fulcrum member for angularly moving said anchor member and said fulcrum member relative to each other and including angularly spaced second locking elements for holding said anchor member and said fulcrum member relative to each other at predetermined smaller equal angular increments, and third locking means including means between said fulcrum member and said second member for angularly moving said fulcrum member and said second member relative to each other and including angularly spaced third locking elements for holding said fulcrum member and said second member relative to each other at predetermined still smaller equal angular increments, said second and third locking elements each being spaced from each other an angular distance greater than the angular increments corresponding thereto, said second and third locking means each including angular distance reducing means independent of said first locking elements for converting the angular distances between adjacent locking elements to said corresponding angular increments.

6. Angle adjusting means comprising a first member and a second member angularly movable with respect to each other about a pivotal axis, an anchor member angularly movable with respect to said members about said pivotal axis, first locking means including angularly spaced first locking elements for locking said anchor member to said first member at angular increments of even degrees, a fulcrum member also angularly movable with respect to said anchor member about said pivotal axis, second locking means between said anchor member and said fulcrum member including means for angularly moving said anchor member and said fulcrum member relative to each other and including angularly spaced second locking elements for holding said anchor member and said fulcrum member relative to each other at angular increments of even minutes, and third locking means between said fulcrum member and said second member including means for angularly moving said fulcrum member and said second member relative to each other and including angularly spaced third locking elements for holding said fulcrum member and said second member relative to each other at angular increments of even seconds, said second and third locking elements each being spaced from each other an angular distance greater than one minute and one second, respectively, said second and third locking means each including angular distance reducing means independent of said first locking elements, the angular distance reducing means of said second locking means converting the angular distance between said second locking elements to minutes and the angular distance converting means of said third locking means converting the angular distance between said third locking elements to seconds.

7. Angle adjusting means comprising a bearing member having a shaft journaled therein, a first member and a second member journaled on said shaft for angular movement with respect to each other and with respect to said bearing member, an anchor member also journaled on said shaft, first locking means including angularly spaced locking elements for locking said anchor member to said first member at predetermined equal angular increments, and second locking means between said anchor member and said second member including means for angularly moving said anchor member and said second member relative to each other and including angularly spaced locking elements for holding said anchor member and said second member relative to each other at predetermined smaller equal angular increments, said second locking elements being spaced from each other an angular distance greater than said smaller angular increments, said second locking means including angular distance reducing means independent of said first locking elements for converting the angular distance between said second locking elements to said smaller angular increments.

8. Angle adjusting means comprising a bearing member having a shaft journaled therein, a first member and a second member journaled on said shaft for angular movement with respect to each other and with respect to said bearing member, an anchor member also journaled on said shaft, first locking means including angularly spaced first teeth carried by said first member and said anchor member to releasably lock said anchor member to said first member at predetermined equal angular increments, second locking means between said anchor member and said second member including a rotatable cam and a cam follower for angularly moving said anchor member and said second member relative to each other and means including angularly spaced second teeth to lock said cam at predetermined angular increments, for holding said anchor member and said second member relative to each other at predetermined smaller equal angular increments, said second teeth being spaced from each other an angular distance greater than said smaller angular increments and said cam and cam follower forming part of an angular distance reducing means for converting the angular distance between said second teeth to said smaller angular increments.

9. Angle adjusting means comprising a bearing member having a shaft journaled therein, a first member and a second member journaled on said shaft for angular movement with respect to each other and with respect to said bearing member, an anchor member also journaled on said shaft, first locking means including angularly spaced first locking elements carried by said first member and said anchor member to lock said anchor member to said first member at predetermined equal angular increments, a fulcrum member also journaled on said shaft, second locking means between said anchor member and said fulcrum member including means for angularly moving said anchor member and said fulcrum member relative to each other and including angularly spaced second locking elements for holding said anchor member and said fulcrum member relative to each other at predetermined smaller equal angular increments, and third locking means between said fulcrum member and said second member for angularly moving said second member relative to said fulcrum member and holding said second member relative to said fulcrum member at predetermined equal angular increments of lesser size than said smaller increments, said second locking elements being spaced from each other an angular distance greater than said smaller angular increments, said second locking means including angular distance reducing means independent of said first locking elements for converting the angular distance between said second locking elements to said smaller angular increments.

10. Angle adjusting means comprising a first member and a second member anglularly movable with respect to each other about a pivotal axis, said first member having an increment portion provided with first locking elements spaced angularly from each other by predetermined first angular increments and positioned on a circle concentric with said pivotal axis, another member also angularly movable with respect to said first member about said axis, said pivotal other member having a locking member for engagement with the locking elements of said increment member, means for engaging said locking member with the locking elements of said increment member to lock said other member to said first member at said predeterminded increments, and means between said other member and said second member for moving said second member relative to said other member about said pivotal axis through predetermined second angular increments less than said predetermined increments, said last-named means including a rotatable cam and a cam follower between said other member and said second member and means including angularly spaced second locking elements to hold said cam at selected angular positions with respect to said cam follower, said second locking elements being spaced from each other a greater angular distance than said second angular increments and said cam and cam follower forming part of an angular distance reducing means for converting the angular distance between said second locking elements to said second angular increments.

11. Angle adjusting means comprising a first member and a second member angularly movable with respect to each other about a pivotal axis, said first member having an increment portion provided with teeth circumferentially spaced from each other by increments of one degree, another member also angularly adjustable with respect to said first member, about said pivotal axis, said other member having a locking member provided with teeth corresponding to the teeth on said first member, means for engaging the teeth of said other member and said increment member to lock said other member to said first member at said one-degree increments, and means for moving said other member and said second member relative to each other about said pivotal axis through predetermined angular increments of less than one degree, said last-named means including a rotatable cam and a cam follower between said other member and said second member and means including angularly spaced locking elements to hold said cam at selected angular positions relative to said cam follower, said locking elements being spaced from each other an angular distance less than said predetermined angular increments, and said cam and cam follower forming part of an angular distance reducing means for converting the angular distance between said locking elements to said predetermined angular increments.

12. A drafting head for a drafting machine comprising a bearing member having a shaft journaled therein, a band receiving drum journaled on said shaft and adapted to be held in a fixed angular position, a casing member also journaled on said shaft for rotation relative to said drum, said casing member being releasably secured to said drum, an anchor member positioned in said casing member and journaled on said shaft, means for locking said anchor member to said casing member in predetermined equal angular increments, a member in said casing member secured to said shaft, means between said anchor member and the member secured to said shaft for holding said anchor member and said member secured to said shaft relative to each other at predetermined smaller equal angular increments, and a ruler carrying base member also secured to said shaft.

13. A drafting head for a drafting machine comprising a bearing member having a shaft journaled therein, a band receiving drum journaled on said shaft and adapted to be held in fixed angular position, a casing member also journaled on said shaft for rotation relative to said drum, said casing member being releasably secured to said drum, an anchor member positioned in said casing member and journaled on said shaft, means including spaced locking teeth carried by said casing member and said anchor member for locking said anchor member to said casing member in predetermined equal angular increments, a member in said casing member secured to said shaft, means including a rotary cam and a cam follower between said anchor member and the member secured to said shaft for holding said anchor member and said member secured to said shaft relative to each other at predetermined smaller equal angular increments, and a ruler carrying base member also secured to said shaft.

14. A drafting head for a drafting machine comprising a bearing member having a shaft journaled therein, a band receiving drum journaled on said shaft, an upwardly opening casing member also journaled on said shaft above said drum and releasably secured to said drum, an anchor member positioned in said casing member and journaled on said shaft, means including spaced locking elements carried by said casing member and said anchor member for locking said anchor member to said casing member in predetermined equal angular increments, a fulcrum member in said casing member secured to said shaft, a cover member for said casing member secured to said fulcrum member, means between said anchor member and said fulcrum member including a rotatable cam member journaled in said fulcrum member and extending upwardly through said cover member, a cam carried by said cam member and a cam follower carried by said anchor member for holding said anchor member and said fulcrum member relative to each other at predetermined smaller equal angular increments, and a ruler carrying base member also secured to said shaft.

15. A drafting head for a drafting machine comprising a bearing member having a shaft journaled therein, a band receiving drum journaled on said shaft, an upwardly opening casing member also journaled on said shaft above said drum and releasably secured to said drum, an anchor member positioned in said casing member and journaled on said shaft, means including spaced locking elements carried by said casing member and said anchor member for locking said anchor member to said casing member in predetermined equal angular increments, a fulcrum member in said casing member secured to said shaft, a cover member for said casing member secured to said fulcrum member, means between said anchor member and said fulcrum member including a rotatable cam member journaled in said fulcrum member and extending upwardly through said cover member, a cam carried by said cam member and a cam follower carried by said anchor member for holding said anchor member and said fulcrum member relative to each other at predetermined smaller equal angular increments, and a ruler carrying base member also secured to said shaft, said cover member having a plurality of spaced teeth carried thereby and arranged in an arc concentric with said cam member, and a lever secured to the upper end of said cam member and having a locking element for engagement with said spaced teeth.

16. A drafting head for a drafting machine comprising a bearing member having a shaft journaled therein, a band receiving drum journaled on said shaft, an upwardly opening casing member also journaled on said shaft above said drum and releasably secured to said drum, an anchor member positioned in said casing member and journaled on said shaft, means including spaced locking elements carried by said casing member and said anchor member for locking said anchor member to said casing member in predetermined equal angular increments, a fulcrum member in said casing member secured to said shaft, a cover member for said casing member secured to said fulcrum member, means between said anchor member and said fulcrum member including a rotatable cam member journaled in said fulcrum member and extending upwardly through said cover member, a cam carried by said cam member and a cam follower carried by said anchor member for holding said anchor member and said fulcrum member relative to each other at predetermined smaller equal angular increments, and a ruler carrying base member also secured to said shaft, said cover member having a plurality of spaced teeth carried thereby and arranged in an arc concentric with said cam member, and a lever secured to the upper end of said cam member and having a locking element for engagement with said spaced teeth, said casing having a graduated ring rotatably mounted on its upper rim and an index on said cover plate adjacent said ring.

17. In a drafting machine having an anchor, an anchor arm pivotally connected at one end to said anchor, a head arm having an end pivotally connected to the other end of said anchor arm to form an elbow and carrying a drafting head bearing member at its other end, a band receiving drum secured against rotation at said anchor, a rotatably mounted band receiving drum at said elbow and a rotatably mounted band receiving drum on said head bearing member, and bands connecting said drums to prevent angular displacement of said drums relative to each other about the axes of said drums; the combination of a drafting head structure having a shaft journaled in said bearing member, said drum on said bearing member being journaled on said shaft, a first member journaled on said shaft concentric with the drum on said bearing member and releasably secured thereto, a ruler carrying base member secured to said shaft, second and third members journaled on said shaft and a fourth member secured to said shaft, first locking means for locking said first and second members together at equal angular increments of even degrees, second locking means including angularly spaced locking elements for locking said second and third members together at equal angular increments of even minutes, and means for locking said third and fourth members together at equal angular increments of even seconds, said locking elements being spaced from each other an angular distance greater than one minute and said second locking means including angular distance reducing independent of said first locking means for converting the angular distances between said locking elements to minutes.

18. In a drafting machine having an anchor, an anchor arm pivotally connected at one end to said anchor, a head arm having an end pivotally connected to the other end of said anchor arm to form an elbow and carrying a drafting head at its other end, a band receiving drum secured against rotation at said anchor, a rotatably mounted band receiving drum at said elbow and a rotatably mounted band receiving drum at said head, and bands connecting said drums to prevent angular displacement of said drums relative to each other about the axes of said drums; the combination of a friction brake structure at said elbow for resisting relative angular displacement between said head arm and the drum at said elbow, a spring counterbalance structure at said anchor including an elliptical gear connected to said anchor arm to pivot therewith, a second elliptical gear meshing with the first-mentioned gear, and spring means connected to said second gear to apply a torque to said anchor arm which balances torque at said pivotal connection due to the weight of said arms and head when said machine is employed on a drafting surface at an angle to the horizontal.

19. In a drafting machine having an anchor, an anchor shaft journaled in said anchor, an anchor arm having one end secured to said shaft for pivotal movement of said arm about said anchor, a head arm having an end pivotally connected to the other end of said anchor arm to form an elbow and carrying a drafting head at its other end, a band receiving drum secured against rotation at said anchor, a rotatably mounted band receiving drum at said elbow and a rotatably mounted band receiving drum at said head, and bands connecting said drums to prevent angular displacement of said drums relative to each other about the axes of said drums; the combination of a friction brake structure at said elbow for resisting relative angular displacement between said head arm and the drum at said elbow and a spring counterbalance structure at said anchor including an elliptical gear secured on said anchor shaft, a second elliptical gear journaled in said anchor and meshing with the first-mentioned gear, and spring means connected to said second gear to apply a torque to said anchor arm through said first-mentioned gear which increases as said anchor arm is displaced from its lowermost position in order to balance the torque on said shaft due to the weight of said arms and head when said machine is employed on a drafting surface at an angle to the horizontal.

20. An anchor and counterbalance structure for a drafting machine having an anchor arm pivotally connected to said anchor, said structure including an elliptical gear secured to said anchor arm for pivotal movement therewith, a second elliptical gear journaled in said anchor and meshing with the first-mentioned gear, and spring means connected to said second gear to apply a torque through said gears to said anchor arm which increases as said anchor arm is moved from its lowermost position so as to balance torque on said arm due to the weight of said drafting machine when said machine is employed on a drafting surface at an angle to the horizontal.

21. An anchor and counterbalance structure for a drafting machine having an anchor arm pivotally connected to said anchor and carrying a drafting head arm and drafting head, said structure including a shaft journaled in said anchor, said anchor arm being secured to one end of said shaft to provide for pivotal movement thereof, a first elliptical gear secured to said shaft, a second elliptical gear journaled in said anchor and meshing with the first-mentioned elliptical gear, said anchor arm having a neutral position in which no torque is exerted on said shaft due to the weight of said arms and head when the drafting machine is employed upon a surface at an angle to the horizontal, the teeth of said second gear which are adjacent its major axis meshing with the teeth of said first gear which are adjacent its minor axis when said arm is in said neutral position, and tension spring means connected to said second gear at a point eccentric to its axis of rotation and on the other side of said axis from said first gear and exerting a spring force toward said first gear whereby said spring counterbalance structure has a dead-center position when said arm is in said neutral position and exerts a torque on said shaft which increases as said arm is moved from its neutral position.

22. An anchor and counterbalance structure for a drafting machine having an anchor arm pivotally connected to said anchor and carrying a drafting head arm and drafting head, said structure including a shaft journaled in said anchor, said anchor arm being secured to one end of said shaft to provide for pivotal movement thereof, a first elliptical gear secured to said shaft, a second elliptical gear journaled in said anchor and meshing with the first-mentioned elliptical gear, said anchor arm having a neutral position in which no torque is exerted on said shaft due to the weight of said arms and head when the drafting machine is employed upon a surface at an angle to the horizontal, the teeth of said second gear which are adjacent its major axis meshing with the teeth of said first gear which are adjacent its minor axis when said arm is in said neutral position, a cross bar pivotally connected to said second gear at a point eccentric to its axis of rotation and on the other side of said axis from said first gear, and a tension spring connected to each end of said cross bar and exerting a spring force toward said first gear whereby said spring counterbalance structure has a dead-center position when said arm is in said neutral position and exerts a torque on said shaft which increases as said arm is moved from its neutral position.

23. Angle adjusting means comprising first and second members angularly movable with respect to each other about a pivotal axis, a third member angularly movable about said pivotal axis with respect to said first and second members, first means including angularly spaced locking elements for locking said third member to said first member at predetermined equal angular increments, said locking elements being spaced from each other angular distances equal to said increments, second means including a pivoted element movable to angularly spaced positions for holding said second and third members relative to each other at predetermined smaller equal angular increments within the first mentioned increments, said positions being spaced from each other equal angular distances greater than said smaller angular increments, said second means including angular distance reducing means actuated by said pivoted element and independent of said locking elements for converting the angular distances between said positions to said smaller angular increments.

24. Angle adjusting means comprising first and second members angularly movable with respect to each other about a pivotal axis for said members, a third member angularly movable about said pivotal axis with respect to said first and second members, first means including angularly spaced locking elements for locking said third member to said first member at predetermined equal angular increments, said locking elements being spaced from each other angular distances equal to said increments, second means including a pivoted element journaled in one of said second and third members and movable to angularly spaced positions for holding said second and third members relative to each other at predetermined smaller equal angular increments within the first mentioned increments, said positions being spaced from each other equal angular distances greater than said smaller angular increments, said second means including angular distance reducing means actuated by said pivoted element and independent of said locking elements for converting the angular distances between said positions to said smaller angular increments, the axis of said pivoted element being parallel to said pivotal axis for said members, said angular distance reducing means comprising a cam carried by said pivoted element and engaging a cam follower carried by the other of said second and third members.

References Cited in the file of this patent

UNITED STATES PATENTS

| Number | Name | Date |
|---|---|---|
| 44,909 | Zuckerman | Nov. 1, 1864 |
| 50,687 | Clippinger | Oct. 31, 1865 |
| 918,065 | Low | Apr. 13, 1909 |
| 1,045,102 | Armstrong | Nov. 19, 1912 |
| 1,358,604 | Zhukoff | Nov. 9, 1920 |
| 2,051,115 | Wallace | Aug. 18, 1936 |
| 2,217,008 | Garner | Oct. 8, 1940 |
| 2,226,882 | Wallace | Dec. 31, 1940 |
| 2,351,246 | Walling | June 13, 1944 |
| 2,374,020 | Ketting | Apr. 17, 1945 |
| 2,443,364 | Vancura | June 15, 1948 |
| 2,452,544 | Brodie | Nov. 2, 1948 |
| 2,479,640 | Rieber | Aug. 23, 1949 |
| 2,560,686 | Curtis | July 17, 1951 |
| 2,662,291 | Little | Dec. 15, 1953 |
| 2,685,944 | Faucher | Aug. 10, 1954 |
| 2,703,458 | Fitzpatrick | Mar. 8, 1955 |
| 2,772,839 | Morton | Dec. 4, 1956 |

UNITED STATES PATENT OFFICE
CERTIFICATE OF CORRECTION

Patent No. 2,851,779                                          September 16, 1958

Joseph B. Cox

It is hereby certified that error appears in the printed specification of the above numbered patent requiring correction and that the said Letters Patent should read as corrected below.

Column 8, line 56, for the numeral "223" read -- 233 --; column 9, line 50, for "connectde" read -- connected --; column 16, line 46, after "associated" insert -- cam --; column 20, line 58, before "axis" insert -- pivotal --; line 59, strike out "pivotal"; column 21, line 12, after "member" strike out the comma.

Signed and sealed this 23rd day of December 1958.

(SEAL)
Attest:

KARL H. AXLINE                                       ROBERT C. WATSON
Attesting Officer                                     Commissioner of Patents